US008854669B1

(12) United States Patent
Jazayeri et al.

(10) Patent No.: US 8,854,669 B1
(45) Date of Patent: Oct. 7, 2014

(54) PRINTER SEARCH AND SELECTION FOR A CLOUD-BASED PRINT SERVICE

(75) Inventors: Mike Jazayeri, New York, NY (US); Sanjeev Radhakrishnan, San Jose, CA (US); Abhijit Kalamkar, Sunnyvale, CA (US); Marc Pawliger, San Jose, CA (US); Scott Byer, Cupertino, CA (US); Yevgeniy Gutnik, Cupertino, CA (US); Yuri Dolgov, Mountain View, CA (US); Tyler Odean, San Francisco, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/563,266

(22) Filed: Jul. 31, 2012

Related U.S. Application Data

(60) Provisional application No. 61/567,616, filed on Dec. 6, 2011.

(51) Int. Cl.
G06F 3/12 (2006.01)

(52) U.S. Cl.
CPC .................................... *G06F 3/1203* (2013.01)
USPC ....................................................... 358/1.15

(58) Field of Classification Search
USPC ....................................................... 358/1.15
See application file for complete search history.

(56) References Cited

U.S. PATENT DOCUMENTS

| | | | |
|---|---|---|---|
| 5,828,864 A | 10/1998 | Danknick et al. | |
| 6,453,129 B1 | 9/2002 | Simpson et al. | |
| 7,092,119 B1 | 8/2006 | Hinds et al. | |
| 7,411,690 B2 | 8/2008 | Tsukada et al. | |
| 8,477,350 B2 | 7/2013 | Jazayeri et al. | |
| 2003/0002072 A1 | 1/2003 | Berkema et al. | |
| 2004/0114175 A1 | 6/2004 | Cherry et al. | |
| 2004/0179229 A1 | 9/2004 | Laughlin | |
| 2004/0196491 A1* | 10/2004 | Uchino | 358/1.15 |
| 2005/0158100 A1 | 7/2005 | Yamaguchi | |
| 2006/0095500 A1 | 5/2006 | Kato | |
| 2006/0158680 A1 | 7/2006 | Fujinawa et al. | |
| 2007/0086054 A1 | 4/2007 | Ikeno | |

(Continued)

FOREIGN PATENT DOCUMENTS

EP 1465052 A2 10/2004
WO 2011115987 A2 9/2011

OTHER PUBLICATIONS

"Server Message Block", from Wikipedia, the free encyclopedia, Aug. 24, 2012, 9 pages.

(Continued)

*Primary Examiner* — Qian Yang
(74) *Attorney, Agent, or Firm* — Brake Hughes Bellermann LLP

(57) ABSTRACT

The embodiments provide a print server including at least one processor, and a non-transitory computer-readable storage medium including instructions executable by the at least one processor. The instructions are configured to implement an application manager configured to receive a print request over a network from an application associated with a device, and a printer searcher configured to determine printer search criteria associated with the print request, search a plurality of available printers associated with a user account of a user of the application based on the determined printer search criteria, and determine a subset of available printers based on the search. The application manager is configured to provide, over the network, a print dialog to the user of the application in response to the print request, where the print dialog may be configured to provide a list of the subset of available printers.

24 Claims, 10 Drawing Sheets

(56) References Cited

U.S. PATENT DOCUMENTS

| | | | |
|---|---|---|---|
| 2007/0159650 | A1 | 7/2007 | Takamatsu et al. |
| 2007/0253020 | A1 | 11/2007 | Hull et al. |
| 2008/0137121 | A1 | 6/2008 | Chrisop et al. |
| 2008/0180724 | A1 | 7/2008 | Selvaraj |
| 2009/0240737 | A1 | 9/2009 | Hardisty et al. |
| 2009/0276266 | A1 | 11/2009 | Nishiyama |
| 2009/0287806 | A1* | 11/2009 | Hamilton et al. .............. 709/223 |
| 2010/0014114 | A1* | 1/2010 | Oosawa ....................... 358/1.15 |
| 2010/0027060 | A1 | 2/2010 | Ogino et al. |
| 2010/0073707 | A1 | 3/2010 | Ferlitsch |
| 2010/0302579 | A1 | 12/2010 | Nuggehalli et al. |
| 2010/0302587 | A1* | 12/2010 | Kawabata et al. ........... 358/1.15 |
| 2010/0309508 | A1 | 12/2010 | Kamath et al. |
| 2010/0328707 | A1 | 12/2010 | Miyake |
| 2011/0075164 | A1 | 3/2011 | Nordback |
| 2011/0096354 | A1 | 4/2011 | Liu |
| 2011/0222104 | A1 | 9/2011 | Mohammad et al. |
| 2011/0235085 | A1 | 9/2011 | Jazayeri et al. |
| 2011/0242554 | A1 | 10/2011 | Farry et al. |
| 2011/0279863 | A1* | 11/2011 | Chang et al. ................. 358/1.15 |
| 2011/0299110 | A1 | 12/2011 | Jazayeri et al. |
| 2012/0044525 | A1 | 2/2012 | Okamura et al. |
| 2012/0057193 | A1 | 3/2012 | Jazayeri |
| 2012/0072376 | A1* | 3/2012 | Akiyama et al. .............. 705/400 |
| 2012/0075665 | A1* | 3/2012 | Sambe ........................ 358/1.15 |
| 2014/0036287 | A1 | 2/2014 | Byer et al. |

OTHER PUBLICATIONS

"CUPS", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

Internet Printing Protocol. from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

Non-Final Office Action for U.S. Appl. No. 13/563,272, mailed Dec. 24, 2013, 20 pages.

Search Report and Written for International Application No. PCT/US2013/052689, mailed Dec. 9, 2013, 8 pages.

* cited by examiner

PRINTER SEARCH AND SELECTION FOR A CLOUD-BASED PRINT SERVICE

CROSS-REFERENCE TO RELATED APPLICATIONS

This application claims the benefit under 35 U.S.C. §119 (e) of U.S. Provisional Patent Application Ser. No. 61/567,616, filed on Dec. 6, 2011. The disclosure of U.S. Provisional Application Ser. No. 61/567,616 is incorporated by reference herein in its entirety.

TECHNICAL FIELD

This description relates to printing.

BACKGROUND

A cloud printing system may provide users with an ability to print content from virtually any application or device, using any cloud-aware printer. In other words, the cloud printing system may provide an ability for virtually any application running on any device within a network to communicate with a cloud print service, to thereby print to any printer that is also in communication with the cloud print service. In one example, in the context of cloud printing, an application may send a print request, over a network, to the cloud print server for printing a document using the cloud print service. In return, the cloud print server may provide a print dialog including a number of available cloud-printers, as well as printing options associated with each available cloud-aware printer. The cloud-aware printers may include all the printers that are associated with a user account of the user and all publically available printers. As such, the number of available printers may be relatively large. Conventionally, the user may have to review the entire printer list and options in order to determine which printer and printing options are best suited for the print job. However, this conventional method is time consuming and does not assist the user in selecting the best printer and printing options for the print job.

SUMMARY

The embodiments provide a print server including at least one processor, and a non-transitory computer-readable storage medium including instructions executable by the at least one processor. The instructions are configured to implement an application manager configured to receive a print request over a network from an application associated with a device, and a printer searcher configured to determine printer search criteria associated with the print request, search a plurality of available printers associated with a user account of a user of the application based on the determined printer search criteria, and determine a subset of available printers based on the search. The application manager is configured to provide, over the network, a print dialog to the user of the application in response to the print request, where the print dialog may be configured to provide a list of the subset of available printers.

The print request may include attribute information indicating a type of document subject to the print request, and the printer searcher may be configured to determine the printer search criteria based on the attribute information.

The printer search criteria may include at least one of a desired printer location, printing option and printing cost. The printer searcher may be configured to determine the printer search criteria based on information associated with the user account. The printer searcher may be configured to determine the printer search criteria based on previous print job information.

The print server may further include a database configured to store a plurality of printer characteristics and associate the plurality of printers with the plurality of printer characteristics, where the printer searcher may be configured to search the database using the determined search criteria as a search term.

The printer searcher configured to determine the subset of available printers may include selecting available printers achieving or approximately achieving the determined printer search criteria.

The printer searcher may be configured to rank the subset of available printers based on a level of achieving the printer search criteria and at least one of previous print job information and printer characteristic information, and the print dialog may include the list of the subset of available printers according to the rank.

The printer characteristic information may include printer location information indicating a location of each available printer, printer quality information indicating a quality of each available printer, and/or printer availability information indicating an availability of each of the plurality of printers.

The printer searcher may be configured to determine a subset of printing options among a plurality of printing options based on the determined print search criteria, and the print dialog may include the subset of printing options.

The printer searcher may be configured to rank a plurality of printing options based on the print search criteria and at least one of previous print job information and printer characteristic information, and the print dialog may be configured to provide the plurality of printing options according to the rank.

The print dialog may include a search box permitting the user to enter at least one search term associated with the printing request. The printer searcher may be configured to re-search the plurality of available printers and re-determine the subset of available printers using the at least one search term as the printer search criteria.

The print server may further include an environmental criterion database configured to store printing options in conjunction with weighted values, where each weighted value may correspond to a relative environmental impact of a corresponding printing option. The printer searcher may be configured to determine an environmental level associated with the print request, where the environmental level may indicate a degree of environmental impact. The printer searcher may be further configured to select environmental printing options based on the weighted values in order to achieve the determined environmental level.

The printer searcher may be configured to determine the environmental level based on the user account. The environmental level may be one of a plurality of default environmental levels, and each default environmental level may indicate a different degree of environmental impact. The degree of environmental impact associated with the environmental level may be a desired total value, and the printer searcher may be configured to select the environmental printing options in order to achieve the desired total value. Each weighted value may be information indicating a numerical value, and the numerical value may increase as the relative environmental impact of a corresponding printing option increases.

The embodiments also provide a method of searching printers in a cloud printing system performed by one or more processors. The method may include receiving a print request over a network from an application associated with a device, determining printer search criteria associated with the print request, searching a plurality of available printers associated with a user account of a user of the application based on the determined printer search criteria, determining a subset of available printers based on the search, and providing, over the network, a print dialog to the user of the application in response to the print request, where the print dialog may be configured to provide a list of the subset of available printers.

The print request may include attribute information indicating a type of document subject to the print request, and the determining printer search criteria associated with the print request may include determining the printer search criteria based on the attribute information. The printer search criteria may include at least one of a desired printer location, printing option and printing cost.

The determining the printer search criteria associated with print request may include determining the printer search criteria based on information associated with the user account. The determining the printer search criteria associated with the print request may include determining the printer search criteria based on previous print job information. The determining the subset of available printers based on the search may include selecting available printers achieving or approximately achieving the determined printer search criteria.

The embodiments also provide a non-transitory computer-readable medium storing instructions that when executed cause one or more processors to search printers in a cloud printing system. The instructions comprising instructions to receive a print request over a network from an application associated with a device, determine printer search criteria associated with the print request, search a plurality of available printers associated with a user account of a user of the application based on the determined printer search criteria, determine a subset of available printers based on the search, and provide, over the network, a print dialog to the user of the application in response to the print request, where the print dialog may be configured to provide a list of the subset of available printers.

Other features will be apparent from the description and drawings, and from the claims.

DETAILED DESCRIPTION

Figure 1:
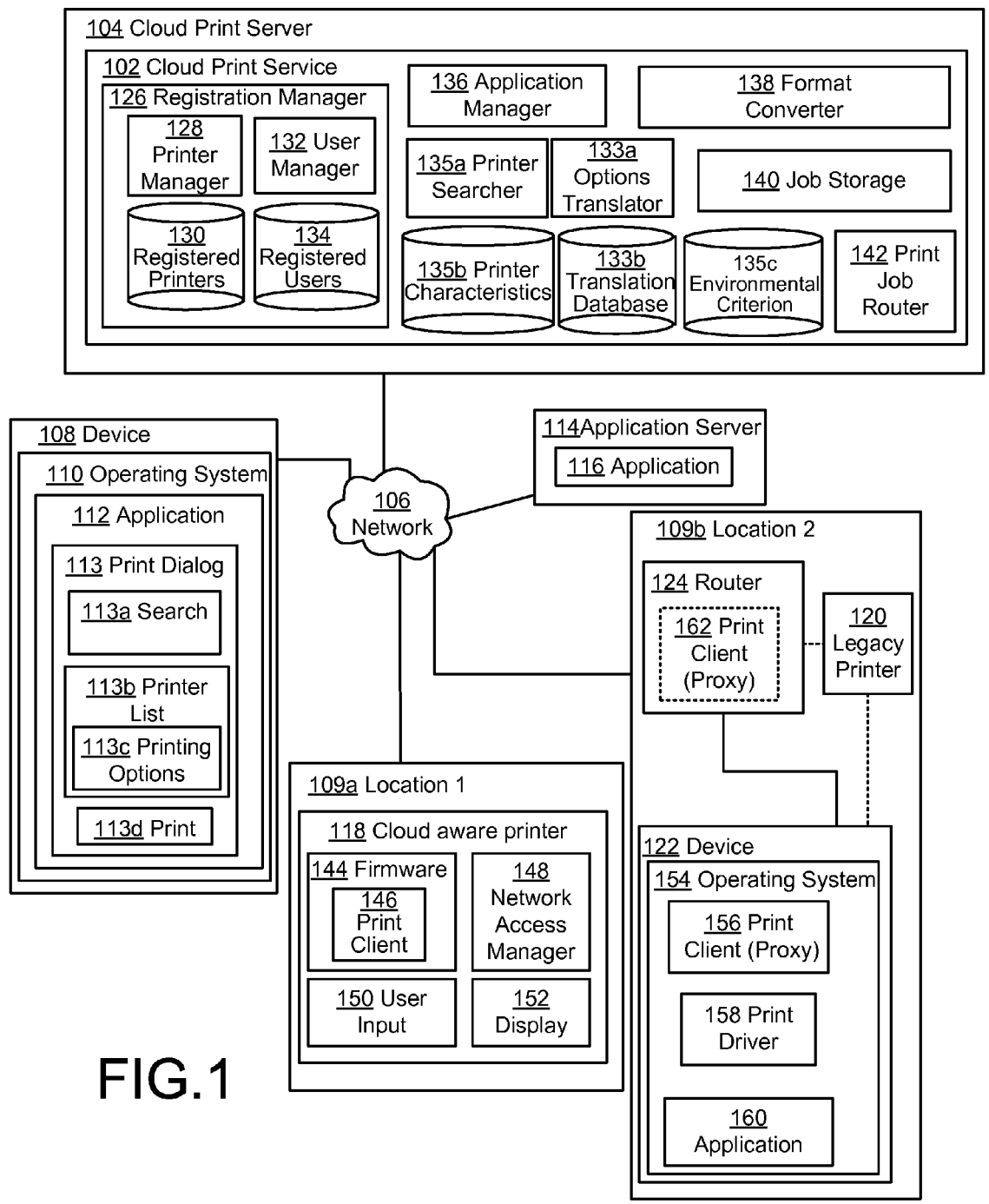
FIG. 1 is a block diagram of a system for implementing a cloud print service.

FIG. 1 is a block diagram of a system 100 for implementing a cloud print service 102. As shown in the example of FIG. 1, the cloud print service 102 may be executed on a cloud print server 104 which provides printing capabilities over a network 106. As described in detail below, the cloud print service 102 provides a user with a uniform printing experience which is platform-independent and which unburdens the user of the need to configure, update, or otherwise maintain or oversee printer operations. Moreover, as also described herein in further detail, the cloud print service 102 may provide a printer searcher 135a that is configured to search the available cloud-aware printers according to print search criteria. The print search criteria may be any type of parameter associated with a printer including location, cost, printing options, and/or capabilities. As a result, a user may identify a printer having one or more desired characteristics relatively quickly. Further, the printer searcher 135a may search, rank, and/or select one or more available printers among the cloud-aware printers associated with a user account of the user according to their suitability for the print job (and/or the user's preferences) based on the user's location and preferences, previous print job history, attributes of the document subject to the print request (e.g., whether the document is an image document or text document), printer characteristics information such as the location, quality, availability and capabilities the printers, and/or other contextual information available to the cloud print service 102. In addition, the printer searcher 135a may search, rank and select printing options for display in a print dialog in a similar manner such that the user is presented with printing options that are more closely aligned with which the user desires. Also, the cloud print service 102 may provide environmental awareness by assisting the user in selecting environmental printers and/or environmental printing options for a particular print request. Various other features and advantages of the cloud print service 102 are described in detail below, and/or would be apparent.

In FIG. 1, a device 108 is illustrated as an example of virtually any computing device from which a user may wish to execute a print job. By way of non-limiting example, then, the device 108 may include a laptop or desktop computer, a netbook, a tablet computer, a smartphone, a camera, or any device which may store or have access to data which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data which the user may wish to print.

In particular, as referenced above, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system 100 of FIG. 1.

The network 106 may thus represent, for example, the public Internet or other wide area public or private network. The network 106 may represent, in further examples, a corporate or other intranet, and/or a smaller-scale, local or personal network, any of which may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing.

In the context of the cloud-aware printer 118, the cloud print service 102 enables the application 112 to print directly to the cloud-aware printer 118, without a requirement or need for (e.g., independently of) involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 102 may make use of the cloud-aware printer 118, as described in detail, below.

For example, the cloud print service 102 may be configured to register the user and/or the device 108, as well as the cloud-aware printer 118. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer 120, which does not natively support communication with the cloud print service 102. Therefore, to illustrate additional or alternative examples of implementations of the system 100 of FIG. 1, a separate device 122 is illustrated, which, as described below, may be modified to impart the advantages of the cloud print service 102 to the legacy printer 120. Similarly, a router 124 may additionally or alternatively be modified to thereby enable the legacy printer 120 to participate in the cloud printing paradigm defined by the operations of the cloud print service 102, as described in detail below.

In short, the system 100 provides an ability for virtually any application running on any device within the network 106 (e.g., the applications 112, 116 and devices 108, 122) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

As referenced above, the system 100 may provide a number of enhanced features and functions related to printer searching and selection. For example, the application 112 may provide a print dialog 113 in conjunction with the cloud print service 102. The print dialog 113 may include a search box 113a, and a printer list 113b identifying a number of printers including the cloud aware printer 118, the legacy printer 120, as well as any other available cloud aware printer that is associated with a user account, e.g., the registered printers 130. The print dialog 113 may include one or more printing options 113c corresponding to each of the printers in the printer list 113b, and a print button 113d to generate a print job.

The cloud print service 102 may search, rank, and select one or more available printers among the plurality of registered printers 130 that are better suited for the print job and/or the user's preferences based on the user's location and/or preferences, previous print job history, attributes of the document subject to the print request (e.g., whether the document is an image document or text document), printer characteristics information such as the location, quality, availability and characteristics of the printers, and/or other information available to the cloud print service 102. In other words, according some aspects of the example embodiments, instead of providing the entire list of the registered printers 130 associated with the user account in the printer list 113b, the cloud print service 102 returns, via the print dialog 113, a subset of available printers that are better suited for the print job and/or the user in the printer list 113b. Similarly, the cloud print service 102 may search, rank, and select one or more printing options that are better suited for the user and/or the print job. Typically, a user may have a relatively excessive number of printing options, e.g., may have access to a large number of printers, each of which may have different characteristics (e.g., location, price, timeliness, printing options). As such, the cloud print service 102 may search, rank, and select a subset of printing options that are better suited for the print job and/or the user based the user's location and/or preferences, previous print job history, the attributes of the document subject to the print request, and/or other information available to the cloud print service 102. As shown in FIG. 1, the print dialog 113 may be configured to provide the printing options in the printing options list 113c.

As shown in FIG. 1, the search box 113a with which the user may search from among, and ultimately select between, such available printers and/or printing options. Based on search criteria entered using the search box 113a, the printer list 113b may be provided which includes the corresponding printer search results and the printing options 113c which includes the corresponding printing options search results. The user may ultimately select a desired printer and printing options, and thus proceed with printing using the print button 113d. In example implementations, the search box 113a may be a single box into which the user may enter search terms for desired printing functionality. For example, the user may enter a zip code, a desired range of paper sizes, and a desired cost per sheet. In other example embodiments, the search box 113a may represent a plurality of techniques for receiving printer search criteria. For example, the print dialog 113 may include a number of selectable options for desired printer characteristics. Then, the user may enter printer search criteria simply by selecting desired printing features.

Further, according to another embodiment, instead of providing the entire list of available printers and default printing options (or user-defined printing options) in the print dialog 113, as further explained below, the cloud print service 102 may search and select a subset of environmental printing options among the universe of printing options so as to modify the default printing options in order to achieve a desired environmental level (e.g., the "most green" printing options), and provides the selected environmental printing options in the printing options 113c of the print dialog 113. Also, the cloud print service 102 may search and select a subset of available environmental printers including the cloud aware printer 118 and/or the legacy printer that have the environmental printing options, and may provide the selected environmental printers in the printer list 113b of the print dialog 113.

For example, the cloud print service 102 may assist the user in selecting a subset of environmental printing options and a subset of available environmental printers to be used for a particular print job in order to achieve a certain environmental level. In other words, instead of the user independently searching the printing options associated with each of the printers associated with the user account and selecting a printer and printing options in order to make the print job more environmentally aware, the cloud print service 102 may search and select the appropriate subset of printers and printing options according to the environmental level set by the user.

The environmental printing options may relate to certain characteristics of the printers themselves such as the amount of power consumed by a respective printer or whether the printer utilizes recycled paper, for example. In addition, the environmental printing options may not necessary be related to printing characteristics for a respective printer, but also include options that relate to how the printing job is performed such as whether the operator of a respective printer uses green energy resources, and/or any other type of option that may be considered good for the environment relative to the user.

Further, the user may have the ability to determine the environmental level for the environmental printing. For instance, the user may be able to select among a plurality of default environmental levels provided by the cloud print service 102. For example, the user may be provided with an option of selecting between an environmental level that is considered most "green", an environmental level that is considered least "green", and any other level or levels between the most "green" environmental level and the least "green" environmental level. The environmental level indicates a degree of environmental impact that the printing job may have on the environment. For instance, the most "green" environmental level may be characterized as having the least environmental impact because the most environmental printing options are selected. As such, the user may select one of the default environmental levels to be used for selecting the environmental printing options.

Also, the user may have the ability to define an environmental level, e.g., a user-defined environmental level. For example, in defining the environmental level, the user may choose which printing options are to be used for environmental printing. For instance, the user may prefer to utilize certain environmental printing options for each printing request. Also, the user may choose which printing options are given more weight than others for selecting environmental printing options. In one example, the user may consider the use of recycled paper relatively important for the environment, and the amount of power consumed by the printer relatively not as important as the recycled paper option. According to the example embodiments, for creating the user-defined environmental level, the user may be able to assign more weight to the recycled paper aspect than the printer power aspect. As such, the cloud print service 102 may select the appropriate printing options based on the weights, which may be adjusted by the user.

Referring to FIG. 1, the cloud print server 102 may include a number of example components or modules which may be utilized to implement functionalities of the cloud print service 102, and, in particular, may be utilized to implement the printer searching capabilities and/or various environmental aspects described herein. In more detail, the cloud print service 102 includes a registration manager 126, which may be configured to register printers and users. As shown, then, a printer manager 128 may be configured to receive a registration of the cloud-aware printer 118 and/or the legacy printer 120, including storing identification information therefore within a data store 130 of registered printers. Similarly, a user manager 132 may be configured to register a user(s) who may currently or potentially wish to execute print jobs using the cloud print service 102, and to store identification information for such users within a data store 134 of registered users.

There are many example scenarios and techniques by which users and/or printers may come to be registered with the cloud print service 102 through the registration manager 126. In general, for example, a user of the device 108 may use a browser to visit a website associated with the cloud print service 102, and may enter a username/password combination to establish a user account with the print service.

In other examples, such users already may have a user account with a separate and possibly related service or service provider. For example, various online services (e.g., other cloud-based computing resources) may provide functionality such as email, data storage, and document processing, and, in such cases, a user already may have a secure user account established in connection therewith. In such cases, the cloud print service 102 may leverage or access such existing user accounts, e.g., to avoid a need to create a new user account, and to facilitate access of existing users of other services with the cloud print service.

Consequently, it may be appreciated that although the user manager 132 and registered users database 134 are illustrated as being within the cloud print service 102, it also may occur that related functionality exists externally to the cloud print service, and is accessed thereby. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user once the user is logged into the application 116.

Techniques for registering users, maintaining user accounts, and maintaining security of users' accounts, are well-known in the art, and are not necessarily described here in detail, except as may be necessary or helpful to understand operations of the system 100, or related systems. Meanwhile, the printer manager 128, as referenced above, is responsible for registering the cloud-aware printer 118, the legacy printer 120, and/or any printer which may interface with the cloud print service 102 and which may currently or potentially be accessed by a user of the cloud print service.

Further, the registration manager 126 may register users with environmental printing. In one example, the registration manager 126 may be configured to render environmental registration information to the user via the application 112, 116, 160 in order to allow the user to register with environmental printing. For example, the environmental registration information may include information that permits the user to select or determine a particular environmental level to be used for environmental printing. The environmental registration information may be render via the print dialog 113 or a separate registration screen. For example, the print dialog 113 may include an option to register for environmental printing. Upon selection of the environmental printing option, the environmental registration information may include information that permits the user to select or determine a particular environmental level. In addition, the print dialog 113 may include an environmental printing option, and when the user selects the environmental printing option, the default environmental level is selected. Alternatively, the user may register with environmental printing at a time of registering with the cloud print service 102 with a new or existing user account, or may register with environmental printing at any time after the user registers with the cloud print service 102, e.g., providing environmental registration information under a "managing printers" option.

The environmental registration information may provide for a selection among the plurality of default environmental levels. For example, the user may be provided with an option of selecting between the environmental level that is considered most "green", the environmental level that is considered least "green", and any other level or levels between the most "green" environmental level and least "green" environmental level. However, the example embodiments encompass any type and number of environmental levels.

Also, the registration manager 126 may provide environmental registration information that allows the user to customize the environmental level. For example, as explained above, the user may want to select certain environmental printing options, or assign more weight to a printing option to be used for the cloud printing job. The registration manager 126 may store the selected or defined environment level in the user account of the data store 127b of registered users.

An application manager 136 may be configured to communicate with any application which may be desired to be used for printing within the system 100, including, e.g., the application 112, and the application 116. Thus, for example, the application manager 136 may implement various application programming interfaces (APIs) which enable such communication with external applications.

In general, the application manager 136 may include the functions of receiving a print request, and then receiving an actual print job, from, e.g., the application 112, 116. In general, the first function of receiving a print request may include providing the user of the application 112 (directly or indirectly) with a print dialog or other user interface with which the user may select an available/associated registered printer. Receiving the print job may include receiving print data to be printed, along with print characteristics characterizing preferences and other aspects of how the print data is desired to be printed (e.g., color vs. black-and-white, paper size, orientation, number of copies, or any other relevant or desired print characteristic). The application manager 136 may conduct other communications with the application 112, as well, such as, e.g., providing a status of a printer or print job. The application manager 136 may communicate with the application 112, 116 (or other application) in a format that is independent of a specific printer, e.g., that is generic with respect to all available or relevant printers within the system 100.

In FIG. 1, the application 112 is illustrated as including the print dialog 113, which, as referenced above, may be provided to the user of the device in order to receive a print request therefrom. The cloud print service 102 may determine the subset of available printers and printing options (as well as environmental friendly printers and/or printing options) among the registered printers 130 in response to the print request, e.g., when the user initially receives the print dialog 113. In addition, the cloud print service 102 may render the list of available printers, and then utilize the search terms provided by the user in the search box 113a to further refine the list of printers.

In example implementations, the printer searcher 135a may be implemented at the cloud print service 102 which receives or otherwise determines printer search criteria, e.g., specified through the user of the search box 113a as just referenced, and which executes a search of available printer characteristics 135b. For example, the printer characteristics 135b may be understood to represent various aspects of available printers which represent a universe of possible printers which might be used by the user for a current print job. As described herein, or as would be apparent, such characteristics may be specific to a given printer, or may be specific to the user account of the user in question. In other example implementations, as described above, the printer searcher 135a determines the printer search criteria without utilizing the search box 113a. For example, the printer searcher 135a may determine the search criteria at or around a time when the application manager 136 receives the print request via a suitable API. In this example, the printer searcher 135a may determine the printer search criteria using at least one of the attribute information, previous print job information, the user's location and/or preferences, printer characteristics information such as the location, quality, availability and characteristics of the registered printers 130, or any other information available to the cloud print service 102. Then, the printer searcher 135a may search and select a subset of available printers achieving or approximately achieving the determined printer search criteria, and present the subset of available printers in the printer list 113b of the print dialog 113 in response to the print request. Thereafter, the user may utilize the search box 113a to further refine the subset of available printers, or search the entire list of registered or otherwise available printers 130.

Also, the printer searcher 135a may rank the registered printers 130 based on at least one of the attribute information, previous print job information, the user's location and/or preferences, printer characteristics information such as the location, quality, availability and characteristics of each printer, or any other information available to the cloud print service 102. The print dialog 113 may be configured to provide the ranked list of registered printers 130, or determined subset, in the printer list 113b.

In addition, the printer searcher 135a is configured to rank the printing options using the attribute information, previous print job information, the user's location and/or preferences, printer characteristics information such as the location, quality, availability and characteristics of each printer, or any other information available to the cloud print service 102. The print dialog 113 may be configured to provide the subset of printing options according to the rank in the printing options list 113c. The provided subset of printing options may be populated by the cloud print service 102 so that the user does not have to independently select the determined printing options. The user may have the option of de-selecting the chosen printing options, and select other printing options associated with a respective printer.

Furthermore, if the user enters additional search terms in the search box 113a, the printer searcher 135a may be configured to re-search, re-select, and re-rank the plurality of registered printers 130, or the determined subset, as well as the printing options. In one example, the user may, over time, utilize a number of available printers. Then, the printer searcher 135a may return a list of "n" most-recently used printers. From among this list, the user may filter for a desired subset. For example, when the user initially receives the print dialog 113, the printer searcher 135a may automatically determine a default number "n" of most-recently used printers from registered printers 130 associated with the user account of the user (where such information may be updated in the context of the printer characteristics 135b), and may provide this list within the printer list 113b. Then, the user may utilize the search box 113a to filter this list to obtain a revised subset of the available printers. For example, where the printers are provided with names, the user may begin typing a desired name (e.g., "home printer 1" or "home printer 2") into the search box 113a. Then, the printer searcher 135a may gradually filter non-conforming printer names until only a single printer remains for selection, or until the user selects a printer. Furthermore, the user may enter any type of search term associated with a printing request. For example, the user may enter search terms associated with a desired printer location, printing option and/or printing cost.

In additional or alternative implementations, the printer characteristics 135b may include many other examples. For example, the printer characteristics 135b may include a physical location of each printer. As shown in FIG. 1, the cloud aware printer 118 is at a first location 109a. Meanwhile, the legacy printer 120 is illustrated as being located at a second location 109b. Consequently, upon receipt of the print request from the application 112, the printer searcher 135a may determine a location of the user/device as part of printer search criteria received with the print request, and may compare this location with the locations 109a, 109b to determine a preferable (e.g., closer) location. For example, the user may enter his or her location using the search box 113a, or may enter a preferred location (e.g., a zip code) where the user wishes to print. In addition, the printer searcher 135a may obtain the user location from the user account stored in the registered user's database 134, or from a suitable GPS system associated with the application 112, 116. As such, the printer searcher 135a provides the initial list of the printers in the printer list 113b as including the available printers having a location that is relatively close to the user's location. Further, the list of printers in the printer list 113b may be ranked according to the distance away from the user's location, and/or previous print job information.

As indicated above, the printer characteristics 135b may include printer-specific features and functions. For example, the printer characteristics 135b may describe whether a given printer has color printing, high-speed printing, two-sided printing, large paper size printing, or various other known or future printing capabilities. Furthermore, the printer characteristics 135b may include printer availability information indicating an available of each of the printers, location information indicating a location of each of the printers, and previous print job information indicating the printing characteristics for previous print jobs. Also, it is noted that the job history information may be stored in the job storage 140. The previous print jobs and associated information such as the location, the user's preferences, printer availability, and printer characteristics may be categorized, characterized, and ranked in a method similar to the way web pages are indexed.

In other examples, as referenced above, the registered printers 130 may include publically-available printers which may not (at least initially) be registered with the user account of the user, but which may be available for cost or fee-based printing. Then, the printer searcher 135a may search such printers, perhaps in conjunction with a location or other characteristics thereof, in order to provide the printer list 113b.

The printer searcher 135a may execute one or more search algorithms and related techniques. For example, the printer searcher 135a may include or be associated with a search index (not explicitly illustrated in FIG. 1) which facilitates rapid location of a desired subset of available printers and/or printing options. Then, one or more search algorithms may be used to leverage the search index. For example, the printer characteristics may include a rank, as previously described above, representing, e.g., a frequency of use of a given printer by the user or other users, and/or a printer rating given to a given printer by the user or previous users.

In the example of FIG. 1, for the sake of clarity and explanation, the printer searcher 135a and the printer characteristics 135b are illustrated as separate components. However, it may be appreciated that the components 135a, 135b may be implemented in whole or in part in the context of a related component(s). For example, the printer manager 128 may be configured to implement the printer searcher 135a, and the printer characteristics 135b may be stored in conjunction with the registered printers 130.

Also, with respect to the environmental aspect of the embodiments, the printer searcher 135a may be configured to determine the environmental level associated with the print request. For example, the printer searcher 135a may determine the environmental level based on the registered users database 134. For example, the printer searcher 135a may communicate with the registered users database 134 in order to determine the environmental level, which has been selected by the user during the registration process. Alternatively, the printer searcher 135a may determine the environmental level based on the environmental level information included in the print request.

Then, the printer searcher 135a may be configured to select environmental printing options from the printing options such that one or more selectable printing options are changed using an environmental criterion database 135c in order to achieve the determined environmental level. For example, the environmental criterion database 135c may be configured to store printing options in conjunction with weighted values. Each weighted value corresponds to a relative environmental impact of a corresponding printing option. Further, the environmental criterion database 135c may be configured to associate a plurality of printers associated with the user account with the corresponding printing options. As such, the printer searcher 135a may be configured to search and select the appropriate environmental printing options among the plurality of printing options stored in the environmental criterion database 135c. Also, although the environmental criterion database 135c and the printer characteristics database 135b are illustrated as separated databases, the embodiments encompass any number of databases (including one database) for storing the types of information described herein.

Figure 2A:
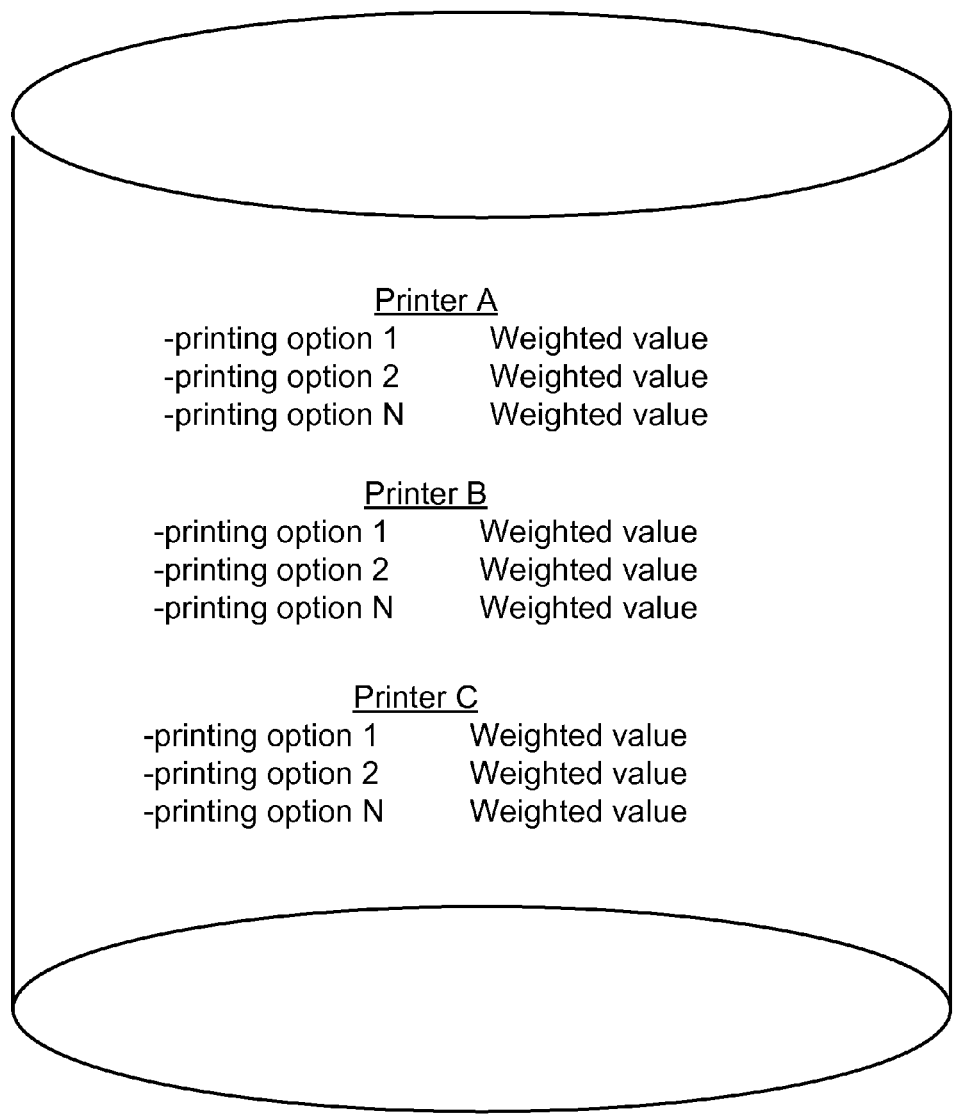
FIG. 2A illustrates an example embodiment of an environmental criterion database of the system of FIG. 1.

FIG. 2A illustrates an example embodiment of the environmental criterion database 135c. Referring to FIG. 2, the environmental criterion database 135c may include a plurality of printing options (e.g., printing option 1 to printing option N) associated with each printer (e.g., Printer A, Printer B, Printer C) that the user may utilize for cloud printing. Although environmental criterion database 135c illustrates the corresponding printing options for each printer, the example embodiments encompass any type of data arrangement such as listing all of the printing options that may be considered for a print job, and then identifying whether a registered printer includes such a printing option.

The parameter N may be any integer greater or equal to one. However, in reality, the printing options may be relatively large. Further, although FIG. 2A illustrates three printers (e.g., Printer A, Printer B, and Printer C), the example embodiments encompass any number of printers to be used for cloud printing. As explained above, the printing options may include any type of printing options that may be associated with a printer such as printer specific characteristics or printing options related to the printing job itself. The printer specific characteristics may include location information indicating a location of the printer. As shown in FIG. 2A, each printing option may correspond to a weighted value, which may indicate a numerical value. The numerical value increases as the relative environmental impact of a corresponding printing option increases. Also, the weighted value may be any other type of value that may indicate a measurement. In one explanatory example, the printing option 1 may be double-sided printing, which has a numerical value of 50, whereas printing option 2 may be printing with a resolution of 300 dpi, which has a numerical value of 10. The numerical value of 50 indicates that a higher importance of environmental impact relative to the user is associated with the double-sided printing than the printing option of 300 dpi resolution, which has a numerical value of 10.

Each weighed value associated with a corresponding printing option in the environmental criterion database 135c may be initially preset. However, the user may adjust one or more weighted values depending on the user's preference. For example, the user may want to assign a relatively higher importance to the type of resolution utilized during the printing job. As such, during the registration process, the environmental registration information provided by the registration manager 126 may include information that allows the user to adjust the weighted values corresponding to the printing options. As such, the registration manager 126 may adjust the weighted values stored in the environmental criterion database 135c. Alternatively, the print dialog 113 may include information that allows the user to adjust the weighted values associated with the printing options. As such, the application manager 136 receives the information provided from the user via the print request, where the printer searcher 135a may adjust the appropriate weighted values in the environmental criterion database 135c.

In terms of weighted values, the degree of environmental impact associated with the environmental level may be characterized as a desired total value. For example, if the user has selected the "most green" environment level, the desired total value may be higher than an environmental level below the "most green" environmental level. The printer searcher 135a may be configured to search and select the printing options in the environmental criterion database 135c using the assigned weighted values such that the total desired value of the environmental level is achieved. In one example, the printer searcher 135a may be configured to select the printing options such that their corresponding weighted values are summed to achieve or approximately achieve the total desired value of the environmental level. However, the printer searcher 135a may be configured to utilize any type of algorithm to search and select the printing options in the environmental criterion database 135c in order to achieve a desired level.

Also, the printer searcher 135a may be configured to select at least one available printer among the plurality of printers based on the selected printing options in order to achieve the determined environmental level. For example, the printer searcher 135a may communicate with the environmental criterion database 135c in order to make such a determination. The environmental criterion database 135c may associate the plurality of printing options associated with each printer. After the printing options are selected by the printer searcher 135a, the printer searcher 135a may determine which printers among the available printers associated with the user account of the user have these selected options.

The application manager 136 may be configured to provide the selected environmental printing options and selected printers to the user in the print dialog 113. The environmental printing options may be pre-populated in the print dialog 113. For example, the application manager 136 may provide the print dialog 113 having the environmental printing options, which are already preselected. Then, the user may review the preselected environmental printing options, and determine whether such printing options are in fact desired.

Referring back to FIG. 1, because various types of printers have a wide variety of printing options, which may describe the same printing options in a number of different formats, the cloud print service 102 may also include an options translator 133a in order to provide the display of the printing options in a uniform manner. For example, the options translator 133a is configured to determine one or more printing options associated with the registered printers 130, and translate a native printer display format of the printing options to a common protocol display format associated with the cloud print service 102. The native printer display format for a particular printing option may be the display format provided by the individual vendor of the printer. However, multiple display formats may exist for the same printing option. As such, the cloud print server 104 may translate the native printer display format of the printing options into the common protocol display format. The common protocol display format may be a display format that is uniform across all cloud-aware printers.

The printing options that are understood by the cloud print service 102 and translated into the common protocol display format may be considered semantically supported and may be referred to as semantic printing options. The cloud print service 102 may semantically support any number and type of printing options such as page resolution, duplex printing (e.g., long-side, short-side), page range, page orientation, size, type of paper, options for color rendering, staples or no staples, split sheet capability, option for bypass tray to put cards, cover inserter, color brightness, page order being forward or reverse, lines per inch in the document being a range from 300 to 1800 and more specifically 300, 600, 1200 and 1800 lines per inch, job fonts, glossy adjust and gradation smoothing for quality of printing, ink separation, screening parameters for quality of printing, color matching, folding, binding, collating, booklet making, slip sheet, drilling, and trimming for job finishing. These options constitute broad capabilities for printing such as job layout, job definition, job quality, job content, job description, job color, job imposition and job finishing.

In one example, the options translator 133a may determine the printing options from capability files that may be stored with the printer characteristics 135b. The printer characteristics 135b may include any type of characteristic associated with the registered printers 130 such as capabilities (e.g., in a form of a capability file), features, and any other type of attribute associated with the printer. The capability files may include information created by vendors to describe the entire set of features and capabilities available for a particular printer. Based on the capability files, the options translator 133a may determine a set of printing options for the registered printers 130 in response to receipt of the print request, and may translate the native printer display format of the printing options associated with the registered printers 130 into the common protocol display format associated with the cloud print service 102. For example, the options translator 133a may disregard the native print display format of the printing options provided in the capability files, and select the common protocol display format associated with the cloud print service from a translation database 133b.

The translation database 133b may store the common protocol display format associated with each capability. For example, for each capability, the translation database 133b may store a corresponding common protocol display format, which may be a common description for a particular printing option. In other words, for a particular printing option (e.g., page resolution), the common protocol display format may be a display format for the printing option that is the same for each printer having the page resolution printing option. Therefore, regardless of the vendor-specific language description, the printing options may be provided to the user in a uniform manner. In addition, the translation database 133b may provide a translation of the common protocol display format in a number of different languages.

Instead of using the native display format of the printing options, the options translator 133a may search the translation database 133b for the capabilities, and locate the corresponding common protocol display format for the appropriate printing options. In addition, the options translator 133a may determine the language associated with the user, locate the capability names corresponding to the printing options in the translation database 133b, and provide the common protocol display format for the printing options in the determined language. For example, the options translator 133a may determine the language of the user based on the user's account from the database 127b of registered users. Also, the options translator 133a may determine the language based on the internet protocol (IP) address associated with the print request. Further, it is noted that the embodiments encompass any known mechanism that may identify a location of the user. Also, although the translation database 133b is illustrated as a separate database from the printer characteristics 135b and the environmental criterion database 135c, the embodiments encompass any number of databases (including one) that may store the capabilities/characteristics of the registered printers 130 as well as the weighting information associated with the environmental aspects.

The common protocol display format may permit the printer searcher 135a to search the number of different printers/print options associated with the cloud print service 102 in a reliable and consistent manner. In particular, the cloud print service 102 may leverage the common protocol display format of the printing options in order to more accurately search the number of available printers/printing options associated with the cloud print service 102. For example, the options translator 133a may translate the native printer display format of the printing options for the printers meeting the print search criteria into the common protocol display format associated with the cloud print service 102.

After the user selects the desired printing options and printer, the print job may be generated and forwarded to the cloud print service 102 via the application manager 136. The print jobs received at the application manager 136 may be passed to the format converter 138, which may be configured to receive the print job and facilitate or execute conversion of the print job into a format associated with the designated (type of) printer for the print job in question. Such conversion may thus generally include, as needed, conversion of the print data itself, as well as conversion of the print characteristics specified in conjunction with the given print job.

For example, printers generally require low-level, device or type-specific instructions which provide a basis by which printers actually apply ink to paper to achieve a desired appearance. Such instructions therefore may include very specific portrayal of the desired print outcome, using, e.g., a Page Description Language (PDL). For example, the language PostScript may be used to describe a desired print outcome, and then rendered (e.g., rasterized) by a specific printer to generate printed text or images. Additionally, fixed-layout document formats exist which are designed to facilitate device-independent printing while maintaining document fidelity. For example, the portable document format (.pdf) is an example of such a format, where .pdf documents may be generated using PostScript. Somewhat similarly, the XML Paper Specification (XPS) provides such a fixed-layout document format, which is based on the eXtensible Markup Language (XML).

Print data may be received from the application 112 in virtually any format, including, e.g., Hypertext Markup Language (HTML), or in a format associated with document processing and/or images (e.g., .jpeg), or in the PDF or XPS formats referenced above. The format converter 138 may thus be configured to receive print data in these and other various formats and convert the print data into a format that is recognizable by a designated printer.

Similarly, the format converter 138 may be configured to convert the print characteristics associated with the print job into a format that is recognizable by the designated printer. That is, as referenced above, the print characteristics may include aspects of how the print data should or can be printed; i.e., based on preferences of the user and/or on capabilities (or lack thereof) of the designated printer(s). For example, the legacy printer 120 may be a black-and-white printer with no two-sided printing abilities, while the cloud-aware printer 118 may be a color printer with two-sided printing. The format converter 138 may then provide conversion, accordingly, depending on a selected printer.

The format converter 138 may provide and execute the resulting, converted print job using, e.g., a protocol referred to herein as a cloud print protocol (CPP). Thus, the cloud print protocol allows the cloud print service to communicate with the cloud-aware printer 118 or the legacy printer 120. Further detail and other aspects of the cloud print protocol are described in more detail, below.

The converted print job may be stored in a data store 140, illustrated as the job storage 140 in FIG. 1. Although illustrated separately in FIG. 1 for the sake of clarity and description, it may be appreciated that the job storage 140 may overlap or coincide with the data stores 130, 134 of the registration manager 126. That is, for example, print jobs of a given user may be stored in conjunction with the user account of the user, and in conjunction with one or more printers registered to that user. As a result, print jobs may be committed to long-term storage, so that, for example, users may locate, identify, and re-print desired print jobs, even if the user later accesses the cloud print service 102 from a different device than was used to originally send a given print job.

Thus, it may be observed that conversion of the print job at least partially occurs at a separate device(s) (e.g., the cloud print server 104, the cloud-aware printer 118, the device 122, or the router 124) from the device(s) on which the originating application is executing (e.g., the device 108, the application server 114, or the device 122). In this way, for example, it is possible to formulate and submit a print job at least partially separately from a conversion of the print job into a printer-specific format, and to thereby divorce such conversion from an underlying operating system of the executing application.

A print job router 142 may be configured to route the converted print job to a designated printer, and otherwise monitor and mediate execution and success/failure of the print job. The print job router 142 may thus be responsible for managing and monitoring on-going print jobs from a plurality of users which are designated for a corresponding plurality of printers, as described in detail, below.

In so doing, the print job router 142 may be configured to execute, e.g., with a print client 146 executing on firmware 144 of the cloud-aware printer 118. The print client 146 may communicate with the cloud print service 102, e.g., with the print job router 142 and/or the registration manager 126, using the cloud print protocol referenced above.

More specifically, the print client 146 may be configured to register the cloud-aware printer 118 with the cloud print service 102, and to thereby associate the thus-registered printer 118 with a user of the device 108. Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory-installed hardware and/or software which provides designated functions without generally requiring or allowing user modification or configuration (e.g., may utilize read-only memory). Thus, the cloud-aware printer 118 may be pre-configured from before a time of purchase to communicate and coordinate with the cloud print service 102, to thereby provide a convenient and enjoyable user experience.

For example, the cloud aware printer 118 may include a network access manager 148, user input 150, and a display (or other user output) 152, which may generally represent conventional components that are not described here in detail except as needed to assist in understanding the operation of the system 100. Of course, the cloud-aware printer 118 also may include other conventional components, which are not discussed here for the sake or clarity and conciseness.

The network access manager 148 may represent associated hardware and/or software which enables the cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to a router such as the router 124.

The user input 150 may represent virtually any sort of keypad, stylus, or other techniques for entering data to the cloud-aware printer 118. Similarly, the display 152 may represent virtually any sort of audio and/or video display to output information to a user of the cloud-aware printer 118.

In example scenarios, then, a user may purchase the cloud-aware printer 118. Upon powering, the cloud-aware printer 118 may automatically output or identify the cloud print service 102, e.g., by printing a URL or other identifier on paper loaded in a paper tray of the cloud-aware printer 118, or by displaying such information using the display 152. Similarly, the cloud-aware printer 118 may output registration information for itself, e.g., a serial number or other unique identifier.

Then, in one example scenario, the purchaser may use the device 108 or other network device to communicate with the cloud print service 102, e.g., by using a browser to visit a website of the cloud print service 102 provided by the cloud print server 104. The user/purchaser may then log into his or her user account associated with the cloud print service 102 and be prompted to enter the registration information for the cloud-aware printer 118.

In other example implementations, the user input 150 and display 152 may similarly be used to communicate directly with the cloud print service 102 using the network access manager 148. For example, upon powering, the cloud-aware printer 118 may automatically connect to the cloud print service 102 using the print client 146 and the network access manager 148, and then use the display 152 to prompt the user/purchaser to login to the cloud print service 102, to thereby automatically associate the cloud-aware printer 118 as being registered to the user/purchaser.

In contrast, the legacy printer 120 may not be manufactured to include the print client 146 and/or other components of the cloud-aware printer 118. For example, the legacy printer 120 may have been manufactured prior to an availability of the cloud print service 102, or simply may have been made without the necessary components to communicate with the cloud print service 102.

In such a case, the legacy printer 120 may be connected in a conventional way to the device 122 (e.g., by USB or other suitable wired or wireless connection). For example, the device 122 may include an operating system 154, which may be used to host a print client 156 which is conceptually similar to the print client 146, and which serves as a proxy for the legacy printer 120 to thereby allow the legacy printer 120 to participate in the system 100.

In some implementations, the print client/proxy 156 may communicate directly with the legacy printer 120 to execute a print job from the cloud print service 102. In other implementations, the operating system 154 may have a conventional printer driver 158 installed for the legacy printer 120, in which case the system 100 may leverage some or all of the functionality of the print driver 158 to drive the legacy printer 120.

Thus, in operation, the print client/proxy 156 may be configured to register the legacy printer 120 with the registration manager 126 (printer manager 128) of the cloud print service 102, in a similar manner(s) as described above and depending on a presence or absence of capabilities of the legacy printer 120 (e.g., whether the legacy printer 120 includes network access, user input and/or display components).

Once registered, an application 160 which may desire to print to the legacy printer 120 may communicate a print job to the cloud print service 102, e.g., in the manner described above with respect to the application 112. As the legacy printer 120 is thus incorporated and integrated into the system 100, it may be appreciated that the application 112 and/or the application 116 may thus print to the legacy printer 120, as easily as to the cloud-aware printer 118. For example, a user of the device 108 may use the application 112 to execute a print job to the legacy printer 120, even if the legacy printer 120 is remote from the device 108 over the network at the time of the printing.

Similarly, a print client 162 may be installed as a proxy component on the router 124, as an addition or alternative to the print client 156, to integrate the legacy printer 120 into the system 100. The print client (proxy) 162 may thus similarly allow for registration of the legacy printer 120 with the cloud print service 102 and with one or more users (e.g., of the device 108 and/or the device 122), and may accept print jobs from the cloud print service 102 which are designated for the legacy printer 120.

Many features and advantages are provided by the system 100 and variations thereof, as referenced herein and/or as would be apparent to one of skill in the art. For example, as described, the system 100 facilitates remote printing in a straight-forward and easily implementable fashion, because a user need only log in to the cloud print service 102 and register a printer using any device (e.g., personal computer, smartphone or other mobile device, or a printer itself). Then, the user can thereafter login to the cloud print service 102 from any device, anywhere on the network 106, and send a print job to the thus-registered printer from any compatible application, even if the device and printer are remote from one another.

In other example implementations, it is possible to share printers between different users. For example, techniques currently exist for sharing documents in existing cloud-based document processing/management systems, such as when a first user sends an email to a second user with a link to a document to be shared. With the system 100, such techniques and concepts can be extended to the realm of printing. For example, the first user may send a link referencing a printer to be shared (e.g., referencing or including registration information for the printer), so that the second, receiving user may simply follow the link to associate the identified printer with the second user's cloud print service user account. In these and other scenarios, users may, e.g., print documents directly to a receiving user, or print work documents to a home printer (or vice versa), and otherwise experience the benefits of remote printing.

Figure 2B:
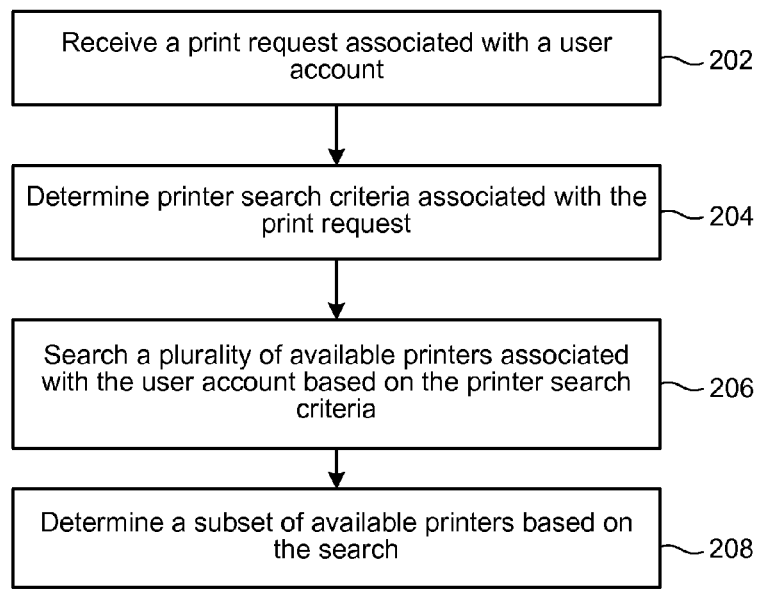
FIG. 2B is a flowchart illustrating example operations of the system of FIG. 1.

FIG. 2B is a flowchart 200 illustrating example operations 202-208 of the system of FIG. 1. Although the flowchart 200 of FIG. 2 illustrates the operations 202-208 in sequential order, it will be appreciated that this is merely an example, and that additional or alternative operations may be included. Further, operations of FIG. 2B and related operations may be executed in a different order than that shown, or in a parallel or overlapping fashion.

In the example of FIG. 2B, a print request associated with a user account may be received (202). For example, the application manager 136 may receive the print request from the application 112, where the user thereof may be signed-in as a registered user with the registration manager 126.

Printer search criteria associated with the print request may be determined (204). For example, the printer searcher 135a may implicitly determine or derive such printer search criteria simply by virtue of receiving the print request. The print request may include attribute information indicating a type of document subject to the print request such as whether the document is an image document or a text document. Therefore, in the case of an image document, the printer searcher 135a may determine the printer search criteria as registered printers which have the capabilities of printing an image document. Also, the printer searcher 135a may determine the printer search criteria as the user's location so that the printer searcher 135a may search and select printers close to the user's location. Further, the printer searcher 135a may utilize the previous print job history, where the printer searcher 135a may determine "n" most-recently used printers which have been used by the user having the user account. Still further, the printer searcher 135a may determine a current location of the user based on a GPS or other location-based information associated with the user or with the device 108 (assuming the user has optionally granted permission for activation of this or related features). In additional or alternative examples, the user may proactively enter desired printer search criteria in the search box 113a, such as a current location of the user, a location of the desired printer, capabilities or functions of the desired printer, fees associated with the desired printing, or other search criteria. Also, the printer searcher 135a may determine the printer search criteria using a combination of any of the above described information, as well as any other information available to the cloud print service 102.

Available printers may be searched, based on the print search criteria and the user account (206). For example, the printer searcher 135a may consider the implicit and/or explicit search criteria provided by the user and/or the print dialog 113 in conjunction with relevant potential printers and associated printer characteristics 135b. As described, various search algorithms and related techniques may be utilized to execute such a search.

A subset of available printers may be determined based on the search (208). For example, the printer searcher 135a may select a subset of available printers that achieve or approximately achieve the determined printer search criteria, and provide the printer list 113b including the determined subset for selection therefrom by the user.

As referenced above, some or all of the operations 202-208 may proceed in an iterative or looped fashion. For example, the printer list 113b may initially include an initial set of printer search results, and the user may thereafter filter or otherwise refine this initial result set. For example, as referenced above, the user may begin typing a name of a desired printer or type of printer into the search box 113a to filter an initial list of printers. In other examples, the user may enter additional search criteria into the search box 113a and the printer searcher 135a may re-execute some or all of the search using the refined search criteria.

Figure 2C:
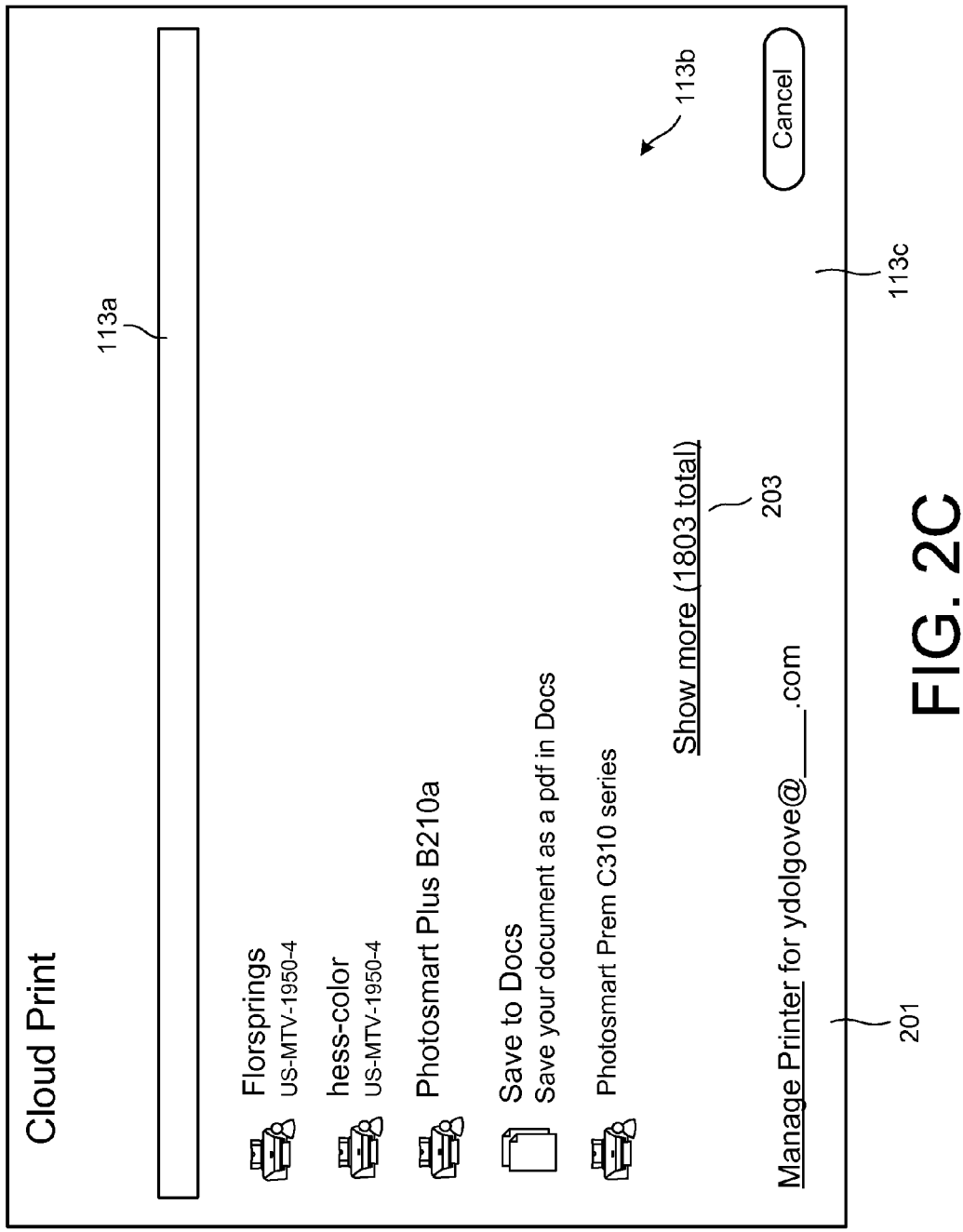
FIG. 2C is an example screenshot illustrating printer search results provided by the system of FIG. 1.

FIG. 2C is an example screenshot illustrating printer search results provided by the printer searcher 135a of the system 100 of FIG. 1. In FIG. 2C, the search box 113a is illustrated as being associated with a printer list 113b, which, as shown, includes a list of printers which may have been selected according to any of the above techniques, or combinations or variations thereof.

As also shown, an option 201 for managing printers may be included. For example, as described herein with respect to the printer manager 128, the user may be enabled to update a list of registered printers to include new registered printers to be associated with the user account (for example, such as when registered printers are shared between users).

Such printer management functionality may include an ability of the user to update the printer characteristics 135b associated with one or more specific printers. For example, the user may, if authorized, be permitted to manually update or describe a location of a specific printer, or other characteristics thereof. Then, these printer characteristics may be used privately by the user for future printer searches. Or, in other implementations, such updates may be made publically available for printer searches by other users or classes of users.

Somewhat similarly, the printer searcher 135a may include or be associated with a printer monitor, which may monitor or otherwise determine relevant printer characteristics. For example, such a printer monitor may monitor current toner levels, usage queues (e.g., current wait times), or other time-varying characteristics of the printers so that such information may be used in providing the printer list 113b.

Thus, by using the above and related features and functions, the system 100 may provide users with intelligent search and selection of available printers, even if the user is not currently aware of a relative suitability or even existence of such printer(s). In this way, a user of the system 100 may experience convenient, cost-effective, and otherwise optimized printing.

Figure 2D:
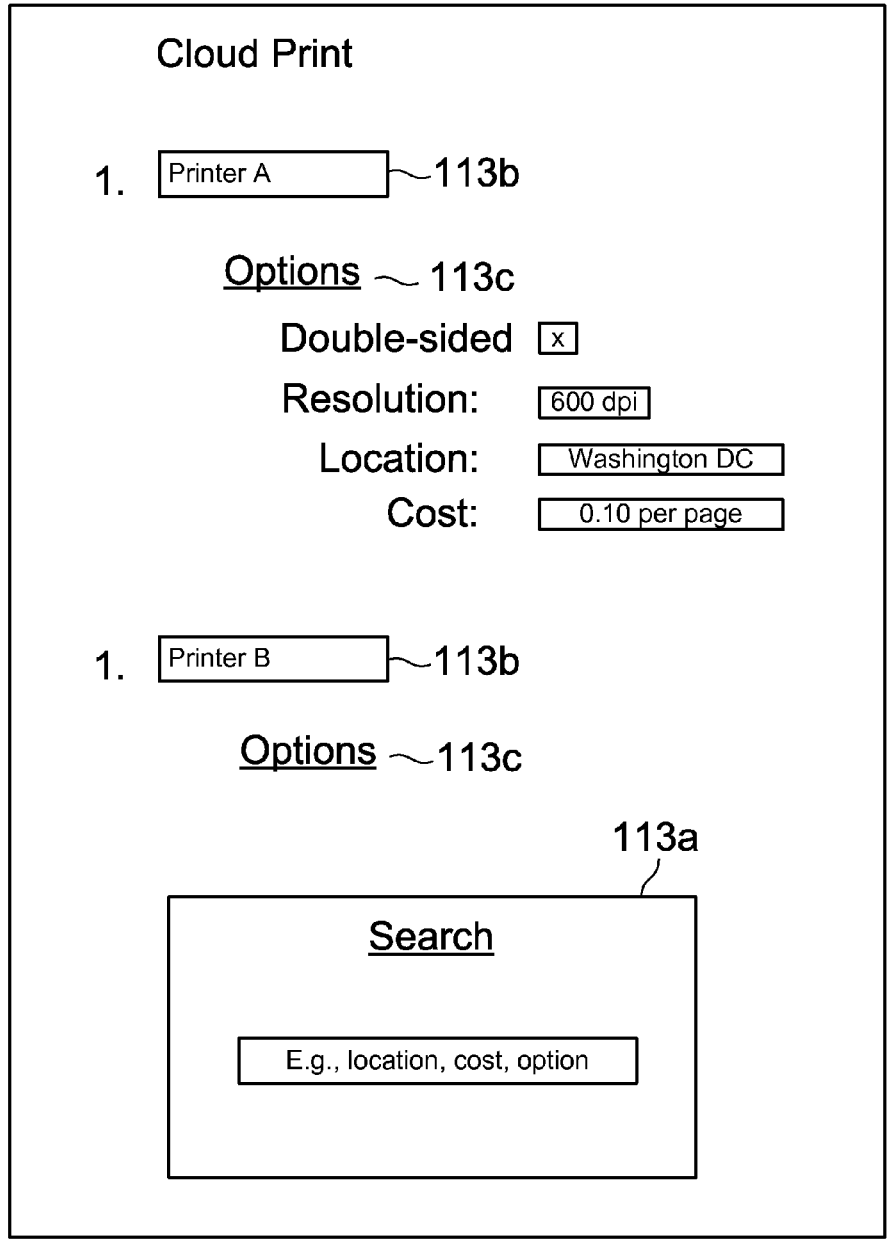
FIG. 2D is an example screenshot illustrating a print dialog provided by the system of FIG. 1.

FIG. 2D is an example screenshot illustrating the print dialog 113 provided by the system of FIG. 1. In FIG. 2D, the print dialog 113 includes a list of printers 113b, a list of printing options 113c, and the search box 113a. In response to the print request, the printer searcher 135a may determine a subset of printers (e.g., Printer A and Printer B) based on the determined printer search criteria. It is noted that although the list of printers 113b in FIG. 2D only includes two printers, it is envisioned that the list of printers 113b may be substantially more. In one example, the determined subset of printers may indicate that Printer A and Printer B are the most used printers among the plurality of registered printers 130. In addition, the subset of printers may be ranked. For instance, the first printer (Printer A) may indicate that Printer A has a higher rank than Printer B. In other words, the print dialog may include ranking information that indicates a particular rank. In the example in FIG. 2D, the ranking information is identified as numeric values 1 and 2. However, the ranking information may encompass any form such as a series of symbols (e.g., 3 out of 4 stars), for example. Also, the ranking information may be implicit in the fact that the printers are provided in a list, and a printer higher on the list would be considered ranked higher than a printer lower on the list.

According to some aspect of the example embodiments, the printer searcher 135a may select a subset of printing options among the universe of printing options to be provided in the print dialog 113. Referring to FIG. 2D, the list of printing options 113c may indicate that double-sided printing and a resolution of 600 dpi, have been previously used by the user, and then the printer searcher 135a may select these printing options (e.g., prepopulate the printing options) as probable printing options to be considered by the user. Also, it is envisioned that the print dialog 113 may include a plurality of other printing options such as whether the user wishes to print the entire document or a subset thereof. Further, the printing options 113c may include other attributes of a respective printer such as the location of the printer as well as the cost associated with a particular print job, if such printer is a publically available printer that charges a fee.

Further, the print dialog 113 includes the search box 113a, as previously described above. The user may enter any search term associated with a printing request such as the location, cost of printing, or particular printing options. In response to submitting such a search request, the printer searcher 135a may re-search and re-rank the plurality of registered printers, and select the printer(s) and/or printing options that achieve or approximately achieve the print search criteria. In addition, the print dialog 113 may include information indicating how the printer was selected. For example, if the search term entered into the search box 113a included a desired location, the print dialog 113 may update the printer list 113b to include one or more printers having the desired location along with search result information. The search result information may be a representative portion of the searched database that caused the respective printer or printers to be selected. In the case of the search result being the desired location, the search result information would be the location(s) of the selected printer(s).

Figure 3A:
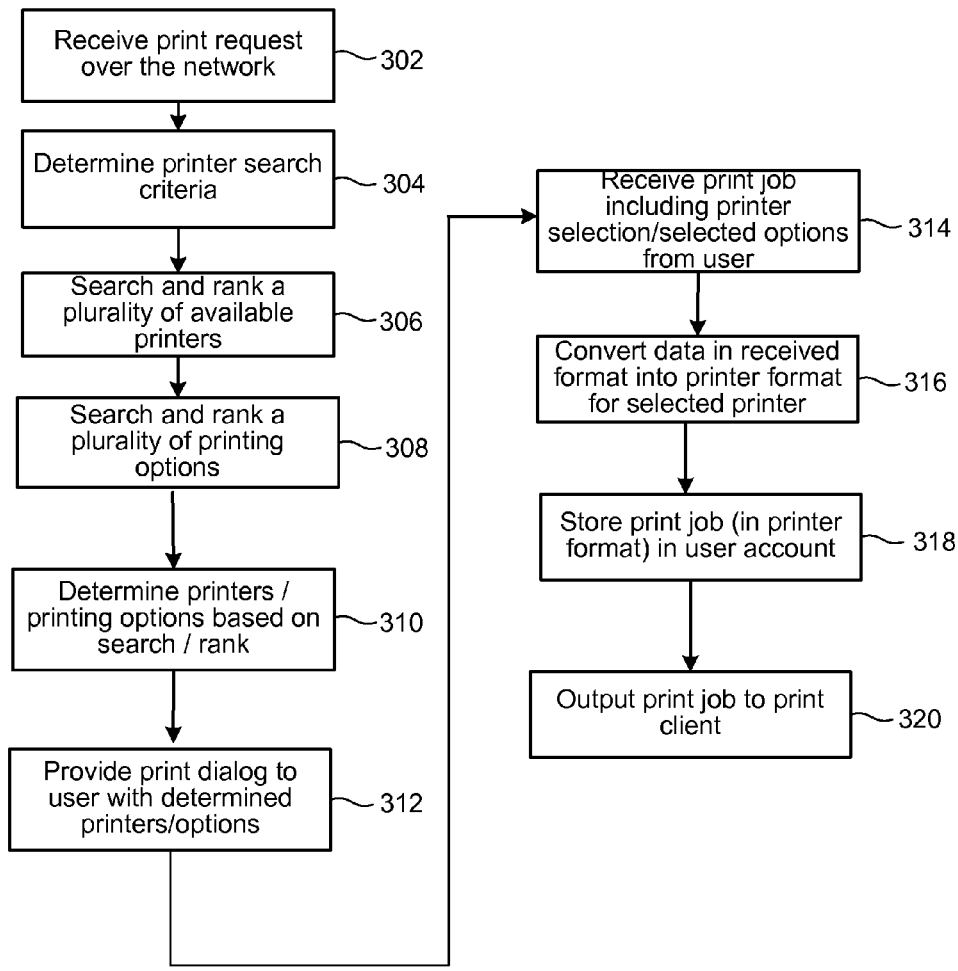
FIG. 3A is a flowchart illustrating more detailed and/or specific more specific examples of the operation of system of FIG. 1.

FIG. 3A is a flowchart illustrating example operations 302-320 of the system of FIG. 1. Although the flowchart of FIG. 3A illustrates the operations 302-320 in sequential order, it will be appreciated that this is merely an example, and that additional or alternative operations may be included. Further, operations of FIG. 3A and related operations may be executed in a different order than that shown, or in a parallel or overlapping fashion.

A print request may be received over the network (302). For example, as described above, the application manager 136 may receive a print request from a user of the application 112 executing on the device 108, or of the application 116 executing on the application server 114, or of the application 160 of the device 122. The print request may be received over the network 106 using an API that is common to the application 112/116/160 and the application manager 136. As explained above, the print request may include attribute information indicating a type of document subject to the print request such as whether the document is an image document or a text document. Further, the print request may include user preference information such as a desired printer location, printing option, and printing cost.

Printer search criteria may be determined (304). For example, as previously described, the printer searcher 135a may implicitly or explicitly determined the print search criteria from information contained in the printing request itself such as the user's preferences and/or attribute information of the document subject to the print request, previous print job information, user information from the user account of registered users 134, the printer characteristics information such as the location, quality, availability and characteristics of each printer, and/or other information available to the cloud print service 102. One or more of these types of information may be stored in the printer characteristics database 135b, the registered printers database 130, the registered users database 134 and/or the job storage 140. In one example, the printer searcher 135a may determine the printer search criteria based on information associated with the user account. Generally, the information associated with the user account may include any type of user preferences that the user has established with the account. Further, the user account may store information related to characteristics of the user such as the user's location, for example.

Also, the printer searcher 135a may determine the printer search criteria based on previous print job information. For example, the previous print job history may indicate which printing options were used in conjunction with which printers. Further, the previous print job history may include other printer characteristics associated with previous used printers. The printer characteristics may encompass any type of printer characteristic associated with a respective printer. In one example, if the attribute information indicates that the document subject to the print request is an image document, and the previous print job history indicates a certain number of printers used by the user for printing image documents, the printer searcher 135a may determine the printer search criteria as printers having the capabilities of printing image documents and have been used or recently used by the user. The printer searcher 135a may make the determination of printer search criteria in response to the print request, or in response to the user proactively entering search terms in the search box 113a.

Also, the printer searcher 135a may determine the printer search criteria to include printing options, in conjunction with the printers. In one example, using the previous print job information, the printer searcher 135a may determine the printer search criteria as a number of recently used printing options. Still further, the printer searcher 135a may determine the print search criteria as the number of recently used printing options for image documents based on the previous print job information and the attribute information. Again, the printer searcher 135a may make the determination of printer search criteria in response to the print request, or response to the user proactively entering the search terms in the search box 113a.

A plurality of available printers are searched and ranked (306). For example, the printer searcher 135a may search the registered printers 130 in the relevant databases (e.g. the print characteristics 135b) in order to determine which registered printers 130 achieve or approximately achieve the print search criteria. As indicated above, the printer searcher 135a may execute one or more search algorithms and related techniques. For example, the printer searcher 135a may include or be associated with a search index (not explicitly illustrated in FIG. 1) which facilitates rapid location of a desired subset of printers. Then, one or more search algorithms may be used to leverage the search index. Further, the printer searcher 135a may search and ultimately determine which registered printers 130 meet the determined print search criteria, as well as which registered printers 130 are available. For example, the printer searcher 135a may search the available printers among the registered printers 130 based on the availability information included in the printer characteristics 135b. Further, the printer searcher 135a may be operable in conjunction with a print manager, which monitors the availability of each of the registered printers via a suitable API in communication with a respective print client such as print clients 146, 156, or 162 of FIG. 1. For instance, based on information provided from a respective print client, the printer searcher 135a may determine that a certain registered printer 130 is not currently available for printing.

Also, the printer characteristics 135b may include a rank, representing, e.g., a frequency of use of a given printer by the user or other users, and/or a printer rating given to a given printer by the user or previous users. Based on the print search criteria, the printer searcher 135a may re-rank the plurality of printers. For example, the printer searcher 135a may be configured to rank the plurality of printers based on a level of achieving the printer search criteria and using at least one of the previous print job information and printer characteristic information such as the quality of the printer and/or the location of the printer. The printer searcher 135a may use any type of ranking technique known in the art. Also, as indicated above, the printer searcher 135a may be configured to rank the plurality of printers based on user feedback information. For example, the cloud print service 102 may provide a mechanism to permit the user to rate or provide comments on the performance of a printer in the cloud print service 102. Based on the user's feedback information, the printer searcher 135a may determine a lower ranking if such feedback information is negative.

A plurality of printing options may be searched and ranked (308). Similar to the searching and ranking of the plurality of printers, the printer searcher 135a may search the printing options in the relevant databases in order to determine which printing options achieve or approximately achieve the print search criteria. As indicated above, the printer characteristics 135b may include a relatively large number of printer characteristics to be used as printing options. The printer searcher 135a may search the printer characteristics 135b using the determined printer search criteria as a search term. The printer searcher 135a may operate in conjunction with the options translator 133a in the common display format, and provide the selected printing options in the common display format (e.g., instead of the native display format). The printer searcher 135a may execute one or more search algorithms and related techniques. Further, the printer characteristics 135b may include a rank, representing, e.g., a frequency of use of a given printing option by the user or other users. For example, the printer searcher 135a may be configured to rank the plurality of printing options in the printer characteristics 135b based on the print search criteria and using the previous print job information. The previous print job information may indicate which printing options have been used for particular print jobs.

A subset of printers and printing options may be determined based on the search and the rank (310). For example, the printer searcher 135a may select a subset of available printers that achieve or approximately achieve the determined printer search criteria according to the rank. For example, the printer searcher 135a may select a number of available printers that achieve or approximately achieve the determined printer search criteria, where the selected number is a certain number of top ranked printers. In addition, the printer searcher 135a may determine the printing options for each selected printer in the subset based on the printing options rankings, e.g., choosing the top ranked printing options.

A print dialog may be provided over the network to the user in association with the application, the print dialog configured to provide for a selection of the subset of available printers associated with the user account (312). For example, the application manager 136 may provide the print dialog 113 to the user of the application 112, 116 in response to the print request. The print dialog 113 includes the list of selected available printers 113b and the list of selected printing options 113c in the common display format. In the print dialog 113, the printing options 113c may be populated, wherein the user has the option of selecting the populated printing options or de-selecting the printing options. Further, the user may have the ability to review and select other printing options that are not readily displayed, by selecting an advance option menu button, for example. The print dialog 113 was previously illustrated with respect to FIGS. 2B-2C.

The print dialog 113 may also include the search box 113a. As such, a user may enter one or more search terms into the search box 113a in order to further narrow the subset of printers or search the entire list of registered printers 130. In such a case, the printer searcher 135a receives the search criteria which have been entered into the search box 113a by the user, and the printer searcher 135a may be configured to re-search and re-rank the available printers and/or printing options, and provide the updated search results on the print dialog 113. In addition, the printer searcher 135a may determine search result information that indicates a representative portion of the searched database (e.g., the printer characteristics 135b) that caused the printer or printers to be selected. For example, if the user enters a particular printer characteristic such as double-sided printing, search result information may be provided on the print dialog 113 to include a representative portion of the searched database that caused the printers to be selected.

Furthermore, the printer searcher 135a may determine ranking information for each selected printer in the print dialog 113. For example, the ranking information may include numerical or graphical information that reflects the ranking of the printer. Each printer in the list may be numbered such as 1, 2, 3, 4, for example. Also, each printer in the list may be associated with one or more symbols that indicate the relevancy of the search result (e.g., 3 out of 4 stars).

A print job may be received, via the print dialog, which includes the selected printer from the selection as well as the selected printing options (314). For example, the application manager 136 may receive a selection of one of the plurality of registered printers 130, which may include either the cloud-aware printer 118 or the legacy printer 120.

The print job including print data and print characteristics expressed in a first format. For example, the application manager 136 may receive the print job designating either of the printers 118, 120. The print job, as described, may include both the actual print data to be printed, as well as print characteristics specifying a manner in which the print data is to be printed, relative to printer capabilities of the selected printer(s). For example, such print characteristics may include a designation of one-sided versus two-sided printing, paper size, paper tray, color versus black-and-white, and various other such well-known print characteristics.

The print job, including the print data and such print characteristics, may be expressed in the first format as a printer-independent format. That is, the print job may be communicated to the application manager 136 by way of an appropriate API and in a manner which is generic or agnostic with respect to the selected printer, or to any printer. Consequently, the application in question need not have any knowledge of the printer to be used, even after the printer has been selected, in order to transmit the print job.

The print job may be converted from the first format into a printer-specific format associated with the selected printer (316). For example, the format converter 138 may be configured to convert the first (e.g., printer-independent) format into a printer-specific format for a selected one of the printers 118, 120. As may be appreciated, and as described herein, the term printer-specific in this context may include, e.g., reference to a specific type, category, or brand of printer, or to a uniquely-identified printer. The print job in the printer-specific format may include a full rasterization of the print job for use in printing by the selected printer (e.g., when the selected printer includes the cloud-aware printer), or may include a partial conversion so that final rasterization may occur later (e.g., at the print client (proxy) 156 and/or the print driver 158 of the device 122, as described herein).

The print job may then be stored in association with the user account of the user (318), e.g., within the job storage 140. The print job may be stored in either the printer-independent format as received from the application 112, or in the printer format associated with the selected printer. In either case, as referenced above, such persistent storage of the print job in association with the user account allows for later location and printing of the same print job at a later date, without having to re-generate the document to be printed (e.g., without having to visit a website at which a document was originally generated).

The print job may then be output to a corresponding print client (320). For example, the print job router 142 may output the converted print job to either of the printers 118, 120, or both, depending on which was selected earlier. If the selected printer does not include a cloud-aware printer, e.g., includes a legacy printer, then the print job may be received at the local print client and communicated to the local print driver (e.g., may be received at the print client(s) 156/162 and communicated to the print driver 158).

It may be appreciated that the burden of converting the print job from the printer-independent format received from the application 112 for actual printing at one of the printers 118, 120, may be shared to varying extents between the format converter 138 and the various print clients 146, 156, 162. For example, in one example using the cloud aware printer 118, the format converter 138 may provide essentially the entire process of determining printer commands for the cloud-aware printer 118. In this case, the print client 146 may be used to receive the print job for forwarding to appropriate printer hardware (e.g., processor(s) driving the associated ink dispensers). In such a case, the cloud-aware printer 118 may be very inexpensive to manufacture, with minimal hardware/software requirements.

In other scenarios, the format converter 138 may execute a partial format conversion, and the print clients 146, 156, 162 may be more involved in calculating or otherwise determining actual, low-level printer commands. Such a practice may be suitable, for example, where a manufacturer of the printer in question has certain specific needs or requirements which are not readily compatible with the cloud print service 102, or, in other cases, where the printer in question already has the processing capabilities to be responsible for a certain amount of the conversion process. In the latter case, although such printers may be relatively more expensive due to supporting the associated hardware and software requirements associated with the conversion(s), it may make sense simply to leverage such existing resources if they do already exist, rather than support them independently at the cloud print service 102. In particular, the legacy printer 120 may already have a relatively large amount of hardware/software resources, including the print driver 158, so that it may make sense to perform a relatively small proportion of the format conversion process at the format converter 138, while allowing the print client 156/162 and the print driver 158 to finalize and execute a final print job.

In either case, the print job may proceed with execution, during which the print job router 142, having provided the print job, may continue to maintain the print job status for provision to the application 112, as needed. For example, after execution of the print job begins, a paper jam may occur at the legacy printer 120. Then, the print job router 142 may become aware of the paper jam through the print client 156, and may thereafter output a notification to the application 112, perhaps using the print dialog of the application manager 136.

Figure 3B:
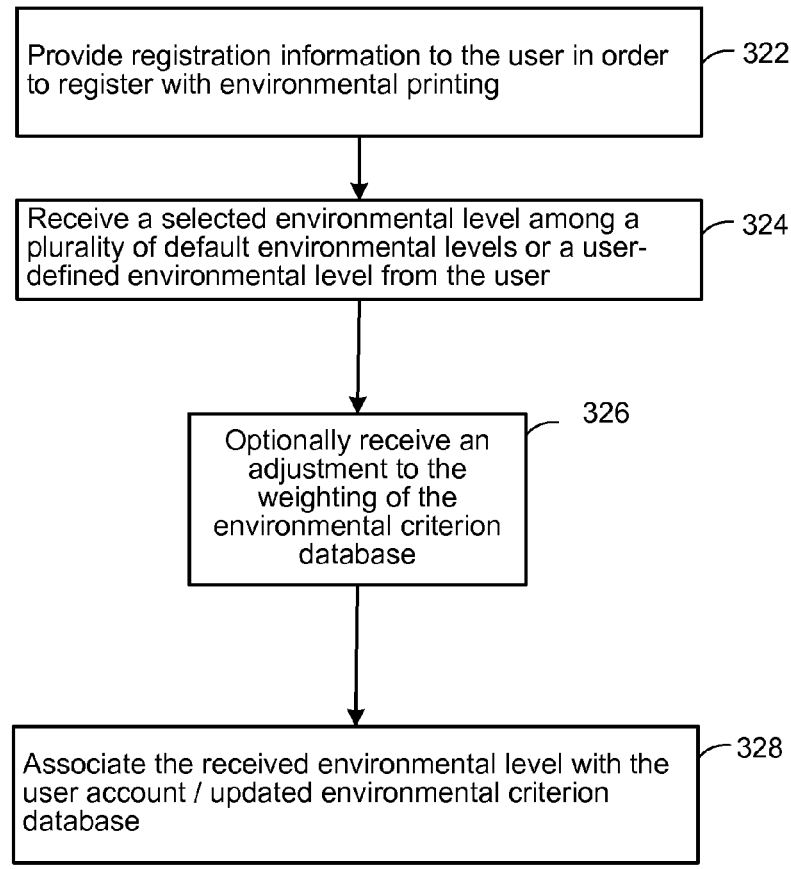
FIG. 3B is a flowchart illustrating example environmental registration operations of the system of FIG. 1.

FIG. 3B is a flowchart illustrating example environmental registration operations 322-328 of the system of FIG. 1. Although the flowchart of FIG. 3B illustrates the operations 322-328 in sequential order, it will be appreciated that this is merely an example, and that additional or alternative operations may be included. Further, operations of FIG. 3B and related operations may be executed in a different order than that shown, or in a parallel or overlapping fashion.

Registration information is provided to the user in order to register with environmental printing (322). For example, the registration manager 126 may be configured to provide environmental register to the user via application 112 in order to allow the user to register with environmental printing. The environmental registration information may be render via the print dialog 113 or a separate registration screen.

In one aspect, the environmental registration information may include information that permits the user to determine of a plurality of default environmental levels, as described above. Further, the environmental registration information includes information that permits the user to create a user-defined environmental level. For example, the environmental registration information includes information that permits the user to select an appropriate environmental level. For example, as indicated above, the degree of environmental impact associated with environmental level may be a desired total value. As such, the environmental registration information includes information that allows the user to adjust the desired total value. For instance, the environmental level may be associated with a level 1 to level 10, where level 10 is associated with the "most green" environmental level. In the user-defined environmental level, the user may adjust the environmental level to any level of level 1 to level 10. It is noted that levels 1-10 are illustrated for the sake of explanation, where the example embodiments encompass any number of environmental levels.

A selected environmental level among a plurality of default environmental levels or a user-defined environmental level may be received from the user (324). For example, the application manager 136 may receive information indicating the selected environmental level or user-defined environmental level along with the print request, if such registration information is provided in the print dialog 113. Further, the registration manager 126 may receive information indicating that the selected environmental level, if the registration information is provided in a separate registration screen. If such information is provided in a separate registration screen, the registration manager 126 may stored the selected environmental level in the registered users database 134.

An adjustment to the weighting of the environmental criterion database 135*c* may be optionally received (326). For example, during the registration process, the registration manager 126 via the separate registration screen or the application manager 136 via the print dialog 113 may provide information permitting the user to adjust the weighted values of the environmental criterion database 135*c*. For example, a user may wish to adjust the environmental impact of a corresponding printing option. In this case, the user may believe a higher environmental impact is associated with printing with recycled paper, for example. The adjustment information may include information permitting the user to adjust the weighed values using a low, medium and high selection. The low selection being associated with a relatively low weighted value, the high selection being associated with a relatively high weighed value (e.g., higher than the low section), and the medium selection being associated with a weighted value in between the high selection and the low selection. The registration screen or the print dialog 113 may illustrate these selections, and the user selects one of them. Also, the adjustment information may include information indicating the actual values of the weighted values, and the user may be permitted to adjust the numerical value associated with the weighted values. It is will appreciated that these examples are further description purposes only, where the example embodiments encompass any type of information that permits the user to adjust the weighted values.

The received environmental level is associated with the user account and/or the environmental criterion database 135*c* is updated (328). For example, the registration manager 126 and/or the application manager 136 may associated the received environmental level with the registered users database 134. Further the registration manager 126 and/or the application manager 136 may updated the environmental criterion database 135*c* according to the user adjustment.

Figure 3C:
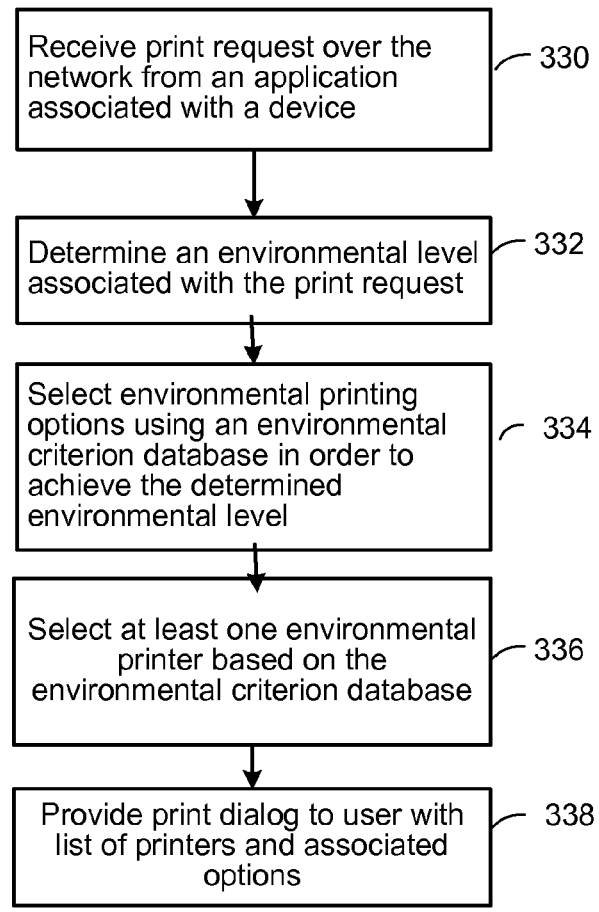
FIG. 3C is a flowchart illustrating example operations of the system of FIG. 1.

FIG. 3C is a flowchart illustrating example operations 330-338 of the system of FIG. 1. Although the flowchart of FIG. 3C illustrates the operations 330-338 in sequential order, it will be appreciated that this is merely an example, and that additional or alternative operations may be included. Further, operations of FIG. 3C and related operations may be executed in a different order than that shown, or in a parallel or overlapping fashion.

In the example of FIG. 3C, a print request from an application associated with a device may be received (330). For example, the application manager 136 may receive the print request from the application 112 over the network 106, where the user thereof may be signed-in as a registered user with the registration manager 126. In a more specific example, a user of the device 108 may be using the application 112, e.g., by reading an email or other document, or by viewing an image within an image viewing application. Within the application, the user may select a print option, e.g., by using a generally conventional technique(s), such as selecting from within a drop-down menu, or selecting a printer icon displayed within the application. Such action may initiate or execute a communication between the application 112 and the application manager 136, so as to notify the application manager 136 that a print job may be forthcoming.

In some examples, the print request may include a number of printing options that may be default or user-defined. Also, the print request may include attribute information indicating a type of a document subject to the print request (e.g., image document or text document), information indicating that environmental printing is selected, and/or environmental-level information indicating the environmental level the user wishes to utilize. Still further, the print request may include a number of user preferences.

An environmental level associated with the print request may be determined (332). For example, the printer searcher 135*a* may determine the environmental level according to a number of different ways. In one example, the printer searcher 135*a* may determine the environmental level based on information associated with the user account. For example, as explained above, the user may register with environmental printing and select an environmental level among a plurality of default environmental levels, where each environmental level is associated with a different degree of environmental impact. Further, the user may create a user-defined environmental level. The selected environmental level and/or user-defined environmental level may be stored in the registered users database 134. The printer searcher 135*a* may determine the environmental level based on the environmental level stored in the registered users database 134.

Also, the printer searcher 135*a* may determine the environmental level based on environmental-level information received with the print request. For example, in submitting the printing request, the user may have indicated a default environmental level or user defined environmental level. As such, when the print request is received by the application manager 136, the printer searcher 135*a* determines the environmental level based on the print request.

Further, the printer searcher 135*a* may determine the environmental level based on information indicating that environmental printing is selected. For example, in submitting the print request, the user may have indicated that environmental printing is selected without necessarily identifying a desired environmental level. However, the printer searcher 135*a* may determine the environmental level as a default environmental level, which has been predefined by the system 100.

Environmental printings options are selected using an environmental criterion database 135c in order to achieve the determined environmental level (334). For example, the printer searcher 135a is configured to search and select environmental printing options from the printing options included in the environmental criterion database 135c such that at least one of the default or user-defined printing options is changed based on the weighted values in the environmental criterion database 135c in order to achieve the determined environmental level. In one example, the printer searcher 135a is configured to search and select the printing options such that their corresponding weighted values are summed to achieve or approximately achieve the total desired value of the environmental level. However, the printer searcher 135a may be configured to utilize any type of algorithm to search and select the printing options in the environmental criterion database 135c in order to achieve a desired level.

Furthermore, if the printing request includes the attribute information, the printer searcher 135a may be configured to select and determine the printing options based on not only the weighted values, but also the attribute information. For example, if the attribute information indicates that the document subject to the print request is an image document, a different set of printing options may be determined or selected in order to meet the environmental level. For example, if such document is an image, the user may want to print the document using color printings and single-sided printing. As such, the printer searcher 135a may search and select the appropriate printing options taking into account the attribute information. Also, the example embodiments are not limited to attribute information. Rather, the printer searcher 135a may be configured to account for any type of user preferences such as location. For example, the user may not want to travel outside a particular area in order to take advantage of more environmental friendly settings. As such, the printer searcher 135a may be configured to account for the location registration in searching and selecting the appropriate environmental printing options so that the environmental level is achieved.

At least one available environmental printer is selected based on the environmental criterion database 135c (336). Initially, the application manager 136 may communicate with a printer manager to determine which registered printers 130 are associated with the user's account, including any printers shared by the user by another user as well as any publically available printers that use the cloud print service 102. For example, the application manager 136 may determine that the user is associated with the cloud-aware printer 118. Based on the status checks referenced above by the print job router 142, it may be assume that the printer 118 has been determined to be available for printing.

At least one environmental printer is selected based on the environmental criterion database 135c (336). For example, the printer searcher 135a is configured to determine an available printer among the plurality of printers associated with the user account of the user based on the selected environmental printing options. For example, the printer searcher 135a communicates with the environmental criterion database 135c in order to make such a determination. For example, the environmental criterion database 135c associates the plurality of printing options associated with each printer. After the printing options are selected by the printer searcher 135a, the printer searcher 135a determines which printers among the available printers associated with the user account of the user have these selected options. However, it is noted that the selection of the printer may be limited by the user preferences. For instance, with the submission of the print request, the user may have indicated a preferred location for printing. Also, the preference of using a certain printer may be stored in the registered users database 134. As such, the printer searcher 135a may consult with the registered users database 134 in order to determine whether there is any user preferences for cloud printing. Therefore, printer searcher 135a searches and selects one or more available printers based on the selected printing options and in accordance with the users preference.

A print dialog with a list of selected environmental printing options and selected at least one environmental printer is provided to the user (338). For example, the application manager 136 may provide such a print dialog either directly or indirectly.

Figure 4:
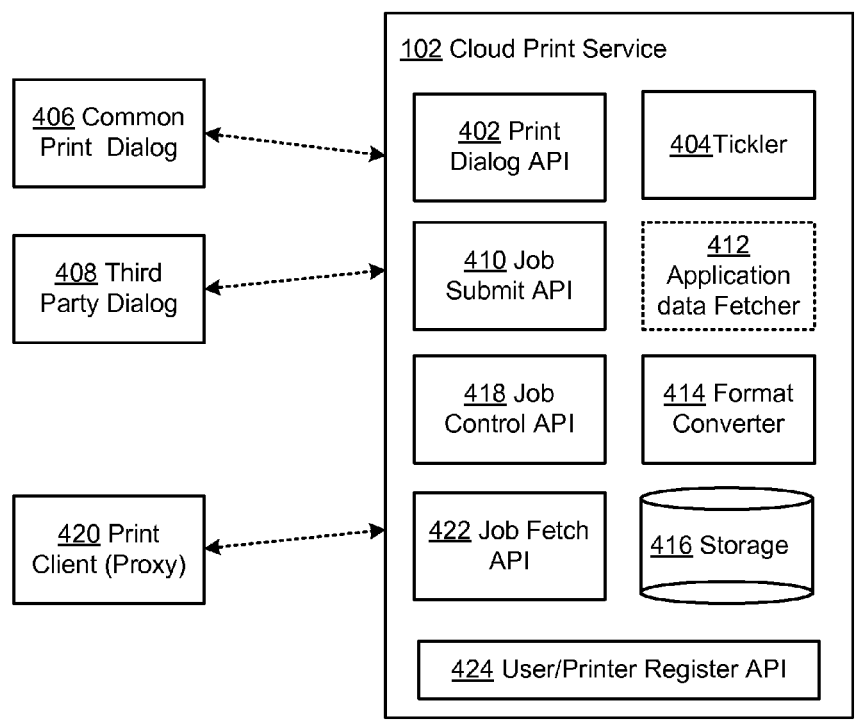
FIG. 4 is a block diagram of a more detailed example of an implementation of a cloud print service of FIG. 1.

FIG. 4 is a block diagram of a more detailed example of an implementation of the cloud print service 102 of FIG. 1. More specifically, FIG. 4 illustrates specific APIs that may be used by the various components of the cloud print service 102. As such, it may be appreciated that such APIs may individually be included in one or more of the various components of the cloud print service 102 illustrated in FIG. 1, as would be apparent.

In the example of FIG. 4, the cloud print service 102 is illustrated as including a print dialog API 402, which is in communication with a tickler 404. The tickler 404 may be operable to send notification(s) of new print jobs available for a given printer(s).

Then, upon authorization of a user by the print dialog API 402, a list of printers, associated printer capabilities, and current jobs per printer and other status information may be provided to the application user, e.g., by way of a common print dialog 406, which may be rendered, e.g., using Javascript. As already explained, such a print dialog 406 may, in appearance, resemble conventional print dialogs, except as otherwise set forth herein (e.g., may allow for selection of an available printer and associated print features). In an example of a non-conventional aspect of the common print dialog 406, the common print dialog 406 may include a field(s) to allow a user to search and identify a previous/stored print job that is persistently stored by the cloud print service 102.

The print dialog API 402 may thus provide (e.g., render) the common print dialog 406 essentially in its entirety for the application user, and thereby provide a common print dialog experience across applications interfacing with the cloud print service 102. As also described, the print dialog API also may simply provide sufficient information for an application developer to construct a third party dialog 408, which may be different in appearance than the common print dialog 406, e.g., may have a proprietary appearance associated with a suite of applications provided by the developer/provider thereof.

Assuming authorization of the user proceeds, the user may then provide printer selection(s) and associated desired print characteristics, as well as the actual print data. The print data may be expressed in any conventional format, e.g., HTML, PDF, XPS, or an image format such as JPG, to name a few.

The print job may then be received at a job submit API 410, e.g., from either dialog 406, 408. In some implementations, the print data may be included by reference to remote print data, e.g., by identification of an appropriate URL. Then, an application data fetcher 412 may be used to retrieve data to be printed.

The job submit API 410 may receive the print job in, to give a specific and non-limiting example(s), a hyper-text transfer protocol (HTTP) multi-part request which may include the printer capabilities expressed, e.g., in XPS, as well as a MIME type identifying the content type. The job submit API may then provide the print job, including the print data and print characteristics, to a format converter 414. The format converter 414 operates essentially as described herein with respect to the format converter 138 of FIG. 1, and stores the print job within storage 416.

A print client 420, which may represent any of the print clients 146, 156, 162 of FIG. 1, communicates with a job control API 418 and a job fetch API 422, to execute the print job. Specifically, the job fetch API 422 may provide the print job to the print client 420, e.g., may be used by the print client 420 to fetch the next available job for the specified printer.

The job control API 418 may be responsible for authorizing the print client 420 as needed, and for receiving updated status information from the printer in question, such as whether the print job has completed or failed. Such status information may also be stored within the storage 416 in associated with a corresponding print job. The job control API may include status information including, e.g., whether a print job is currently queued and not yet downloaded to a corresponding print client 420, or spooled/downloaded and added to the client side native printer queue (if applicable).

In further examples of the print client as the print client proxy 156, it may occur that the proxy fetches print jobs in PDF format, along with the user-selected print characteristics represented as XML. Then, the proxy may use a PDF interpreted library to rasterize and print the PDF.

Finally in FIG. 4, a user/printer register API 424 is illustrated which is responsible for communicating with the print client 420 to register the user(s) and all associated printers. Such registration information may be communicated using a HTTP multi-part request, and may include identification of the printer along with the printer capabilities (e.g., expressed in XPS), and may be stored in the storage 416 with the various print jobs. Further, such registration processes and information may occur previously to actual print job executions, or interspersed therewith. In the latter case, for example, the user may seek to execute a print job only to find that all available printers are currently occupied, jammed, or offline. Nonetheless, it would be a simple matter for the user then to register a new printer with the cloud print service 102 and proceed accordingly with the newly-registered printer to execute the desired print job.

Many other examples and variations of the systems and operations of FIGS. 1 to 4 would be apparent to one skilled in the art. For example, instead of printing to a hardware printer, the system(s) 100/400 or similar systems may be used to print to PDF or other software format.

Figure 5:
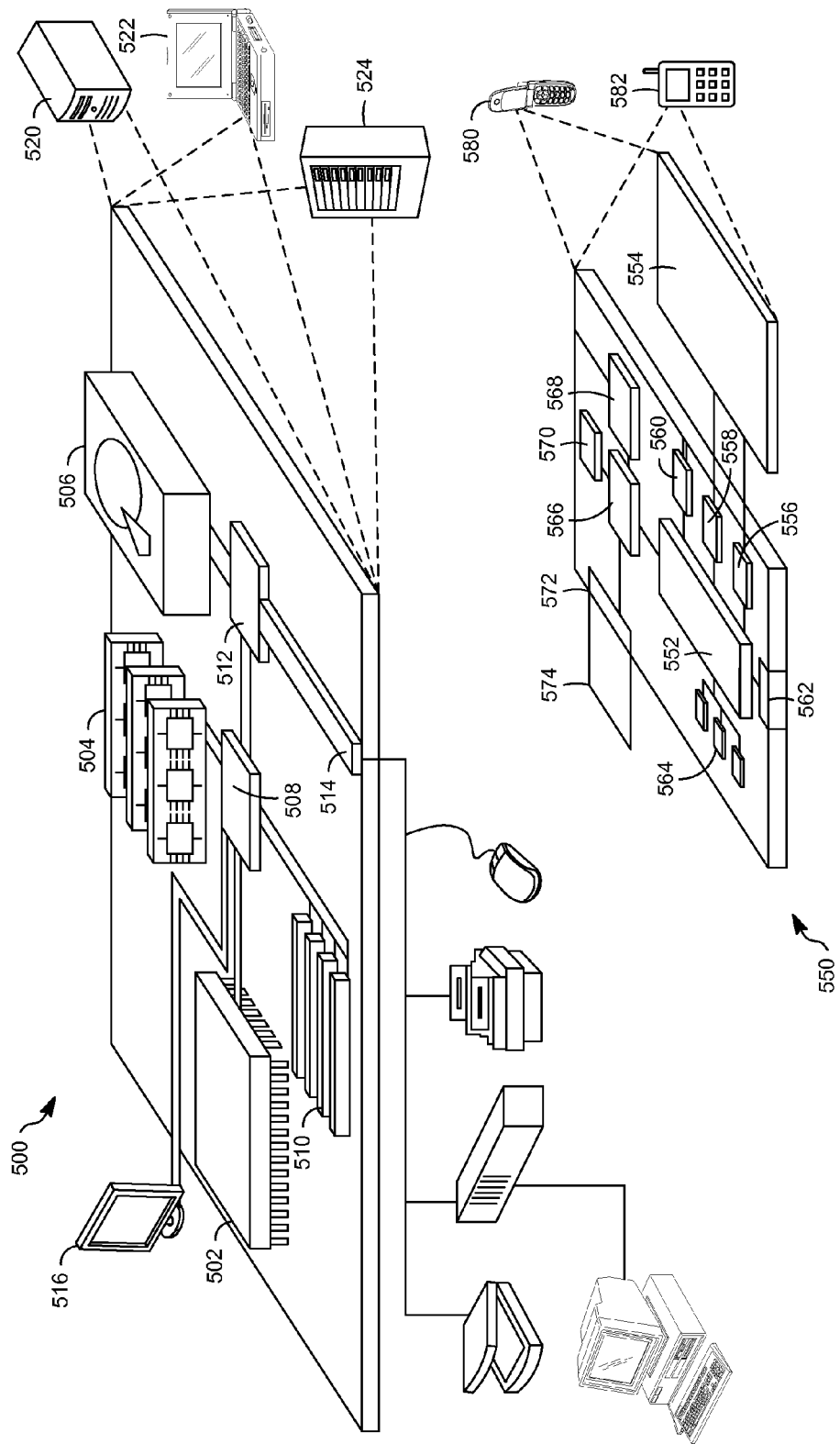
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print server comprising:
    at least one processor;
    a non-transitory computer-readable storage medium including instructions executable by the at least one processor, the instructions configured to implement:
    an application manager, implemented at the print server, configured to receive a print request for content to be printed using a cloud print service executing on the print server, over a network, from a user of an application associated with a device, the cloud print service being associated with a user account of the user, the user account being associated with a plurality of printers that are potentially available to the user for printing the content of the print request, the plurality of printers including one or more printers registered with the user account of the user; and
    a printer searcher, implemented at the print server, configured to determine printer search criteria associated with the print request, the printer searcher configured to search available printers among the plurality of printers associated with the user account using the determined printer search criteria and printer characteristics stored in at least one database accessible by the print server, the at least one database, the printer searcher configured to select a subset of printers among the searched available printers that substantially meets the determined printer search criteria,
    the application manager configured to provide, over the network, a print dialog to the user of the application in response to the print request, the print dialog including a list of printers selected by the printer searcher such that the subset of printers are provided instead of all available printers associated with the user account.

2. The print server of claim 1, wherein the print request includes attribute information indicating a type of document subject to the print request, and the printer searcher is configured to determine the printer search criteria based on the attribute information.

3. The print server of claim 1, wherein the printer search criteria includes at least one of a printer location, printing option and printing cost, the printing option being at least one print criteria specifying how the content will be printed.

4. The print server of claim 1, wherein the printer searcher is configured to determine the printer search criteria based on at least one of user preferences and user location that have been stored in the user account.

5. The print server of claim 1, wherein the printer searcher is configured to determine the printer search criteria based on previous print job information stored in association with the user account, the previous print job information providing information about one or previous print jobs that used one or more printers associated with the user account.

6. The print server of claim 1,
    wherein the printer searcher includes a search index, the printer searcher beings configured to search the at least one database using the search index to select the subset of printers meeting the determined search criteria.

7. The print server of claim 1, wherein the printer searcher is configured to select the subset of printers based on which available printers associated with the user account were used within a previous time period for one or more previous print jobs such that the printer searcher selects a number of most recently-used printers.

8. The print server of claim 1, wherein the printer searcher is configured to rank the subset of printers based on a level of achieving the printer search criteria in conjunction with the printer characteristics about the available printers associated with the user account, and the print dialog includes the list of the subset of printers according to the rank.

9. The print server of claim 8, wherein the printer characteristics includes printer location information indicating a location of each available printer, and printer quality information indicating a quality of each available printer.

10. The print server of claim 1, wherein the printer searcher is configured to determine a subset of printing options among a plurality of printing options based on the determined print search criteria, and the print dialog includes the subset of printing options, each printing option being a different printing criteria specifying how the content will be printed.

11. The print server of claim 1, wherein the printer searcher is configured to rank a plurality of printing options based on the print search criteria and at least one of previous print job information and the printer characteristics, and the print dialog is configured to provide the plurality of printing options according to the rank, each printing option being a different printing criteria specifying how the content will be printed.

12. The print server of claim 1, wherein the print dialog includes a search box permitting the user to enter at least one search term corresponding to one or more desired printer functionalities associated with a printer and determine the print search criteria based on the at least one search term or further refine the subset of printers by re-searching the available printers associated with the user account and selecting one or more printers of the subset that substantially meets the at least one search term.

13. The print server of claim 1, further comprising:
an environmental criterion database configured to store printing options in conjunction with weighted values, each weighted value corresponding to a relative environmental impact of a corresponding printing option,
wherein the printer searcher is configured to determine an environmental level associated with the print request, the environmental level indicating a degree of environmental impact,
wherein the printer searcher is further configured to select environmental printing options based on the weighted values in order to achieve the determined environmental level,
wherein the selected environmental printing options are displayed within the print dialog.

14. The print server of claim 13, wherein the printer searcher is configured to determine the environmental level based on the user account.

15. The print server of claim 13, wherein the environmental level is one of a plurality of default environmental levels, and each default environmental level indicates a different degree of environmental impact.

16. The print server of claim 13, wherein the degree of environmental impact associated with the environmental level is a desired total value, and the printer searcher is configured to select the environmental printing options in order to achieve the desired total value.

17. The print server of claim 13, wherein each weighted value is information indicating a numerical value, and the numerical value increases as the relative environmental impact of a corresponding printing option increases.

18. A method of searching printers performed by one or more processors, the method comprising:
receiving, by a print server implementing a cloud print service, a print request for content to be printed, over a network, from an application associated with a device, the cloud print service being associated with a user account of a user of the device, the user account being associated with a plurality of printers that are potentially available to the user for printing the content of the print request, the plurality of printers including one or more printers registered with the user account of the user;
determining, by the print server, printer search criteria associated with the print request;
searching, by the print server, available printers among the plurality of printers associated with the user account using the determined printer search criteria as a search term within at least one database accessible by the print server, the at least one database storing printer characteristics for the plurality of printers;
selecting, by the print server, a subset of printers among the searched available printers that substantially meets the determined printer search criteria; and
providing, by the print server, over the network, a print dialog to the user of the application in response to the print request, the print dialog including a list of printers that have been selected by the selecting step such that the subset of printers are provided instead of all available printers associated with the user account.

19. The method of claim 18, wherein the print request includes attribute information indicating a type of document subject to the print request, and the determining printer search criteria associated with the print request includes determining the printer search criteria based on the attribute information.

20. The method of claim 18, wherein the printer search criteria includes at least one of a printer location, printing option and printing cost, the printing option being at least one print criteria specifying how the content will be printed.

21. The method of claim 18, wherein the determining the printer search criteria associated with print request includes determining the printer search criteria based on at least one of user preferences and user location that have been stored in the user account.

22. The method of claim 18, wherein the determining the printer search criteria associated with the print request includes determining the printer search criteria based on previous print job information stored in association with the user account, the previous print job information providing information about one or previous print jobs that used one or more printers associated with the user account.

23. The method of claim 18, wherein the printer searcher is configured to determine a subset of printing options among a plurality of printing options based on the determined print search criteria, and the print dialog includes the subset of printing options, each printing option being a different printing criteria specifying how the content will be printed.

24. A non-transitory computer-readable medium storing instructions that when executed cause one or more processors to search printers in a cloud printing system, the instructions comprising instructions to:
receive, by a print server implementing a cloud print service, a print request for content to be printed, over a network, from a user of an application associated with a device, the cloud print service being associated with a user account of the user, the user account being associated with a plurality of printers that are potentially available to the user for printing the content of the print request, the plurality of printers including one or more printers registered with the user account of the user;
determine, by the print server, printer search criteria associated with the print request;
search, by the print server, available printers among the plurality of printers associated with the user account using the determined printer search criteria as a search term within at least one database accessible by the print server, the at least one database storing printer characteristics for the plurality of printers;
select, by the print server, a subset of printers among the searched available printers that substantially meets the determined printer search criteria; and
provide, by the print server, over the network, a print dialog to the user of the application in response to the print request, the print dialog including a list of printers that have been selected such that the subset of printers are provided instead of all available printers associated with the user account.

* * * * *